US012710797B2

(12) United States Patent
Lee et al.

(10) Patent No.: US 12,710,797 B2
(45) Date of Patent: Aug. 18, 2026

(54) SYSTEM ON CHIP AND METHOD FOR OPERATING THE SAME

(71) Applicant: Samsung Electronics Co., Ltd., Suwon-si (KR)

(72) Inventors: Seokwon Lee, Suwon-si (KR); Jong-Jin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/760,348

(22) Filed: Jul. 1, 2024

(65) Prior Publication Data

US 2025/0190039 A1 Jun. 12, 2025

(30) Foreign Application Priority Data

Dec. 7, 2023 (KR) ........................ 10-2023-0177076

(51) Int. Cl.

| | |
|---|---|
| ***G06F 1/26*** | (2006.01) |
| ***G06F 1/08*** | (2006.01) |
| ***G06F 1/20*** | (2006.01) |
| ***G06F 1/324*** | (2019.01) |
| ***G06F 1/3296*** | (2019.01) |
| ***G06F 11/30*** | (2006.01) |

(52) U.S. Cl.

CPC .................. *G06F 1/26* (2013.01); *G06F 1/08* (2013.01); *G06F 1/20* (2013.01); *G06F 1/206* (2013.01); *G06F 1/324* (2013.01); *G06F 1/3296* (2013.01); *G06F 11/3058* (2013.01)

(58) Field of Classification Search

CPC .......... G06F 1/26; G06F 1/324; G06F 1/3296; G06F 1/206; G06F 1/08; G06F 11/3058; G06F 1/20

USPC ......................................... 713/300, 322, 340

See application file for complete search history.

(56) References Cited

U.S. PATENT DOCUMENTS

| | | | |
|---|---|---|---|
| 6,427,211 | B2 | 7/2002 | Watts, Jr. |
| 9,360,907 | B2 | 6/2016 | Doshi et al. |
| 9,465,423 | B2 | 10/2016 | Vadakkanmaruveedu et al. |
| 9,900,424 | B2 | 2/2018 | Wang et al. |
| 10,061,331 | B2 | 8/2018 | Saeidi et al. |
| 10,390,420 | B2 | 8/2019 | Baek |
| 10,474,209 | B2 | 11/2019 | Park et al. |
| 10,496,141 | B2 | 12/2019 | Lee et al. |

(Continued)

FOREIGN PATENT DOCUMENTS

| | | |
|---|---|---|
| CN | 115145378 A | 10/2022 |

*Primary Examiner* — Ji H Bae

(74) *Attorney, Agent, or Firm* — Fish & Richardson P.C.

(57) ABSTRACT

Disclosed is a system-on-chip. The system-on-chip including at least one operation processing unit configured to process an instruction based on a driving voltage and a clock signal, a temperature management module configured to estimate a cooling coefficient and a heating coefficient associated with the at least one operation processing unit based on a temperature measured at the at least one operation processing unit, and determine an operating frequency of the clock signal to be sent to the at least one operation processing unit based on the cooling coefficient and the heating coefficient, and a dynamic voltage and frequency scaling (DVFS) module configured to output a control signal for adjusting the driving voltage and the clock signal based on the operating frequency.

18 Claims, 15 Drawing Sheets

(56) References Cited

U.S. PATENT DOCUMENTS

2005/0201188 A1* 9/2005 Donze .................... G11C 7/04 365/232
2008/0228959 A1* 9/2008 Wang .................... G06F 1/206 710/22
2008/0306704 A1* 12/2008 Rockenfeller .......... G06F 1/206 702/132
2014/0249690 A1* 9/2014 Park .................... G06F 1/3206 702/132
2017/0023969 A1* 1/2017 Shows .................. G06F 9/5094
2017/0068261 A1 3/2017 Hsu et al.
2017/0271031 A1* 9/2017 Sharon .................. G11C 29/52
2021/0109562 A1* 4/2021 Ragland .................. G06F 1/324
2022/0261064 A1* 8/2022 Rapaka .................... G06F 1/04
2022/0334558 A1* 10/2022 Huang ............... G05B 19/4155
2022/0413594 A1 12/2022 Chung et al.
2023/0071918 A1 3/2023 Park et al.
2024/0103591 A1* 3/2024 Clark .................... G01K 7/427

* cited by examiner

| SoC Level | Operating Frequency | Driving Voltage |
|---|---|---|
| 4 | 1.2Ghz | 650mV |
| 3 | 1.1Ghz | 600mV |
| 2 | 1.0Ghz | 550mV |
| 1 | 0.9Ghz | 500mV |
| 0 | 0.8Ghz | 450mV |

FIG. 11

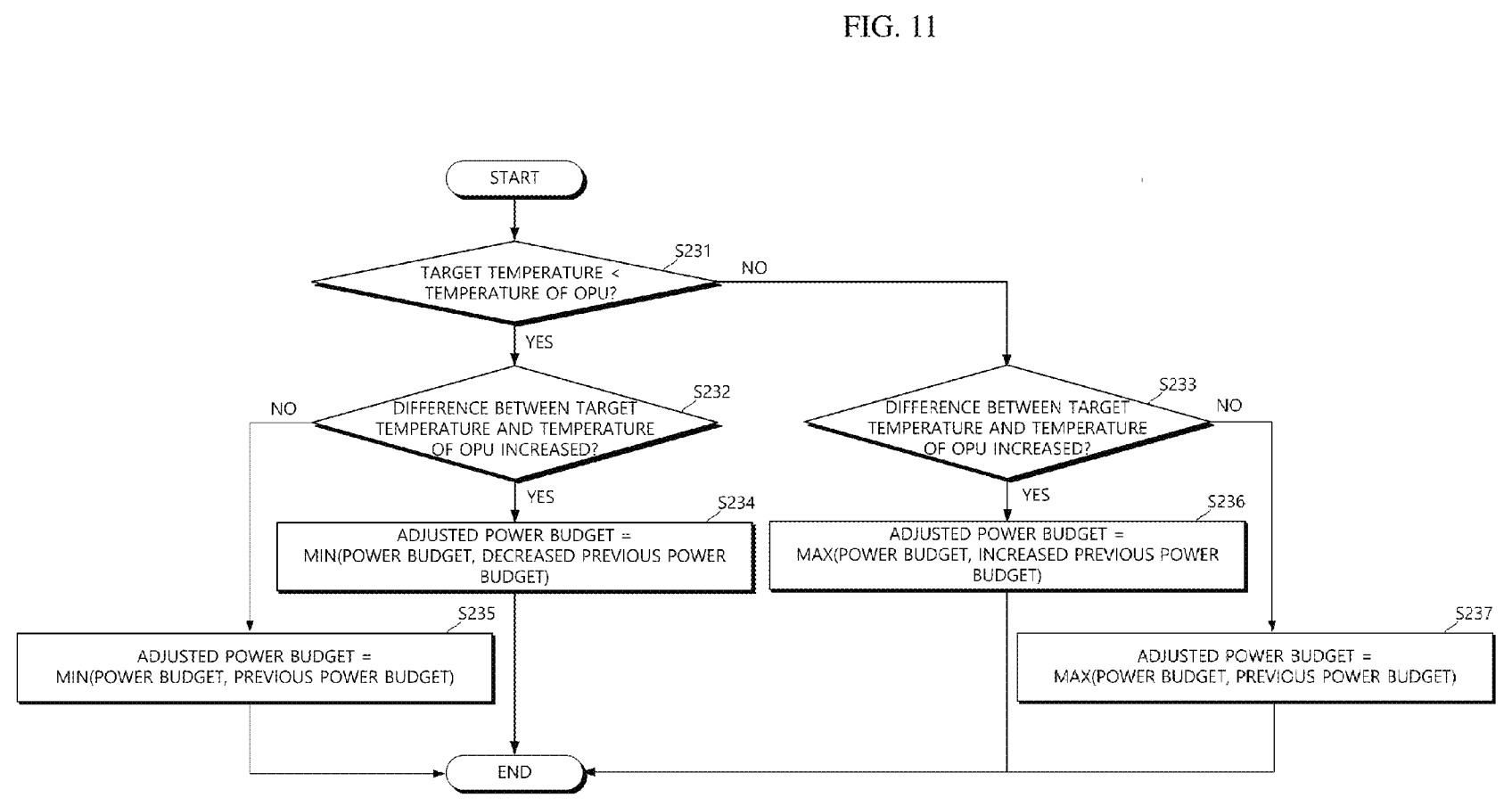

START

S231
TARGET TEMPERATURE < TEMPERATURE OF OPU?

YES

NO

S232
DIFFERENCE BETWEEN TARGET TEMPERATURE AND TEMPERATURE OF OPU INCREASED?

S233
DIFFERENCE BETWEEN TARGET TEMPERATURE AND TEMPERATURE OF OPU INCREASED?

S234
ADJUSTED POWER BUDGET = MIN(POWER BUDGET, DECREASED PREVIOUS POWER BUDGET)

S235
ADJUSTED POWER BUDGET = MIN(POWER BUDGET, PREVIOUS POWER BUDGET)

S236
ADJUSTED POWER BUDGET = MAX(POWER BUDGET, INCREASED PREVIOUS POWER BUDGET)

S237
ADJUSTED POWER BUDGET = MAX(POWER BUDGET, PREVIOUS POWER BUDGET)

END

FIG. 14

SYSTEM ON CHIP AND METHOD FOR OPERATING THE SAME

CROSS-REFERENCE TO RELATED APPLICATIONS

This application claims priority under 35 U.S.C. § 119 to Korean Patent Application No. 10-2023-0177076 filed on Dec. 7, 2023, in the Korean Intellectual Property Office, the disclosures of which are incorporated by reference herein in their entireties.

BACKGROUND

Example embodiments of the present inventive concepts described herein relate to a system on chip (SoC) capable of stably controlling temperature.

A system-on-chip (SoC) refers to a system semiconductor in which various functional blocks are included, such as an operation processing unit such as a central processing unit (CPU), a memory, a communication modem, a peripheral interface circuit, and the like, to drive an electronic system such as a computer system and are integrated into one chip. In a mobile electronic system, a SoC may be called an application processor (AP).

Generally, there is a dynamic voltage frequency scaling (DVFS) scheme that calculates power using proportional-integral-differential (PID) control and dynamically adjusts the frequency and voltage of a system-on-chip. The DVFS method based on PID control may have difficulty responding flexibly to temperature changes in the system-on-chip (SoC), and errors due to domain conversion may occur during intermediate calculations. In addition, the DVFS method based on PID control may require complex configuration in terms of implementation, such as the complexity of calculating dynamic power and static power, the need for hardware modules to check the ambient temperature of a system-on-chip (SoC), power calculation based on thermal resistance values, and the like.

SUMMARY

Example embodiments of the present inventive concepts provide a system-on-chip (SoC) capable of stably controlling temperature.

According to some example embodiments, a system on chip includes at least one operation processing unit configured to process an instruction based on a driving voltage and a clock signal; a temperature management module configured to estimate a cooling coefficient and a heating coefficient associated with the at least one operation processing unit based on a temperature measured at the at least one operation processing unit, and determine an operating frequency of the clock signal to be sent to the at least one operation processing unit based on the cooling coefficient and the heating coefficient; and a dynamic voltage and frequency scaling (DVFS) module configured to output a control signal for adjusting the driving voltage and the clock signal based on the operating frequency.

According to some example embodiments, a method of operating a system on chip (SoC) includes checking, by a temperature management module, a temperature of an operation processing unit measured by a temperature sensor; estimating, by the temperature management module, a cooling coefficient and a heating coefficient of the operation processing unit based on the temperature; determining, by the temperature management module, an operating frequency of a clock signal to be sent to the operation processing unit based on the cooling coefficient and the heating coefficient; outputting, by a dynamic voltage and frequency scaling (DVFS) control module, control signals that adjust each of a driving voltage and the clock signal sent to the operation processing unit based on the operating frequency; and processing, by the operation processing unit, an instruction based on the driving voltage and the clock signal.

According to some example embodiments, an electronic device includes at least one electrical circuit configured to be driven based on a received driving voltage and a parameter; a temperature management module configured to estimate a cooling coefficient and a heating coefficient associated with the at least one electrical circuit based on a temperature measured at the at least one electrical circuit, and determine a value of the parameter to be sent to the at least one electrical circuit based on the cooling coefficient and the heating coefficient; and a circuit controller configured to output a control signal for adjusting the parameter based on the value of the parameter.

The system-on-chip (SoC) according to some example embodiments may stably control temperature.

The system on chip (SoC) according to some example embodiments may calculate power for operation at a target temperature without adding additional hardware.

BRIEF DESCRIPTION OF THE DRAWINGS

The above and other objects and features of the present inventive concepts will become apparent by describing in detail embodiments thereof with reference to the accompanying drawings.

FIG. 6 is a diagram illustrating a DVFS table of a SoC according to some example embodiments;

FIG. 11 is a flowchart illustrating a method of adjusting the power budget of a system-on-chip (SoC) according to some example embodiments;

Figure 14:
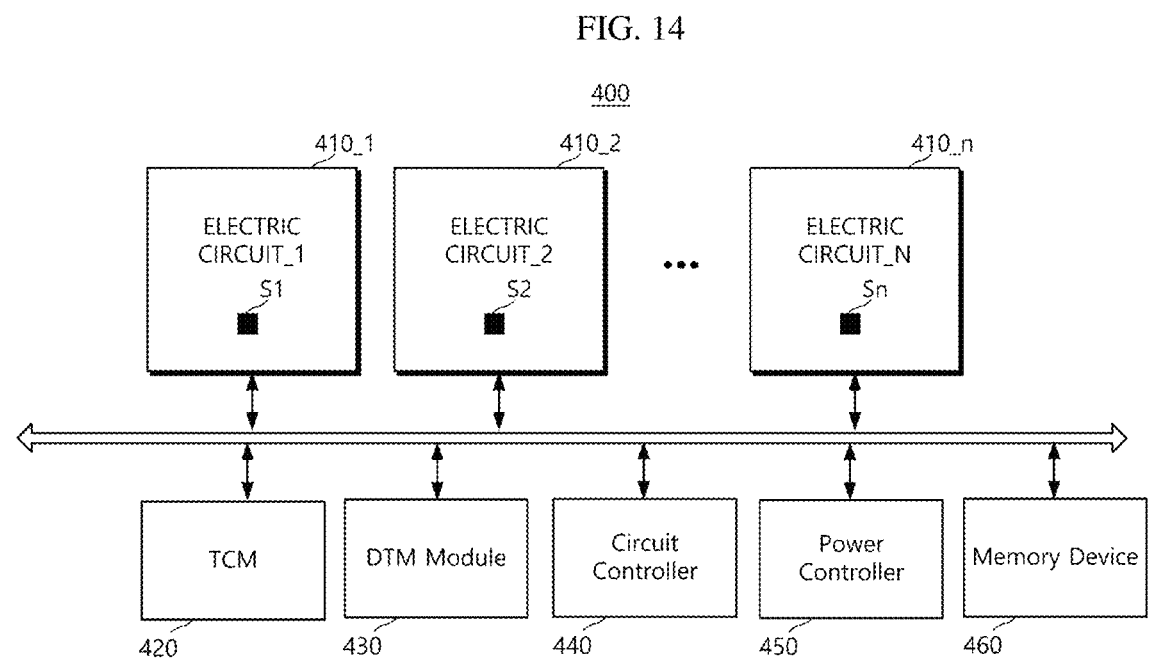

FIG. 14 is a block diagram showing an example electronic device according to some example embodiments;

DETAILED DESCRIPTION

Figure 1:
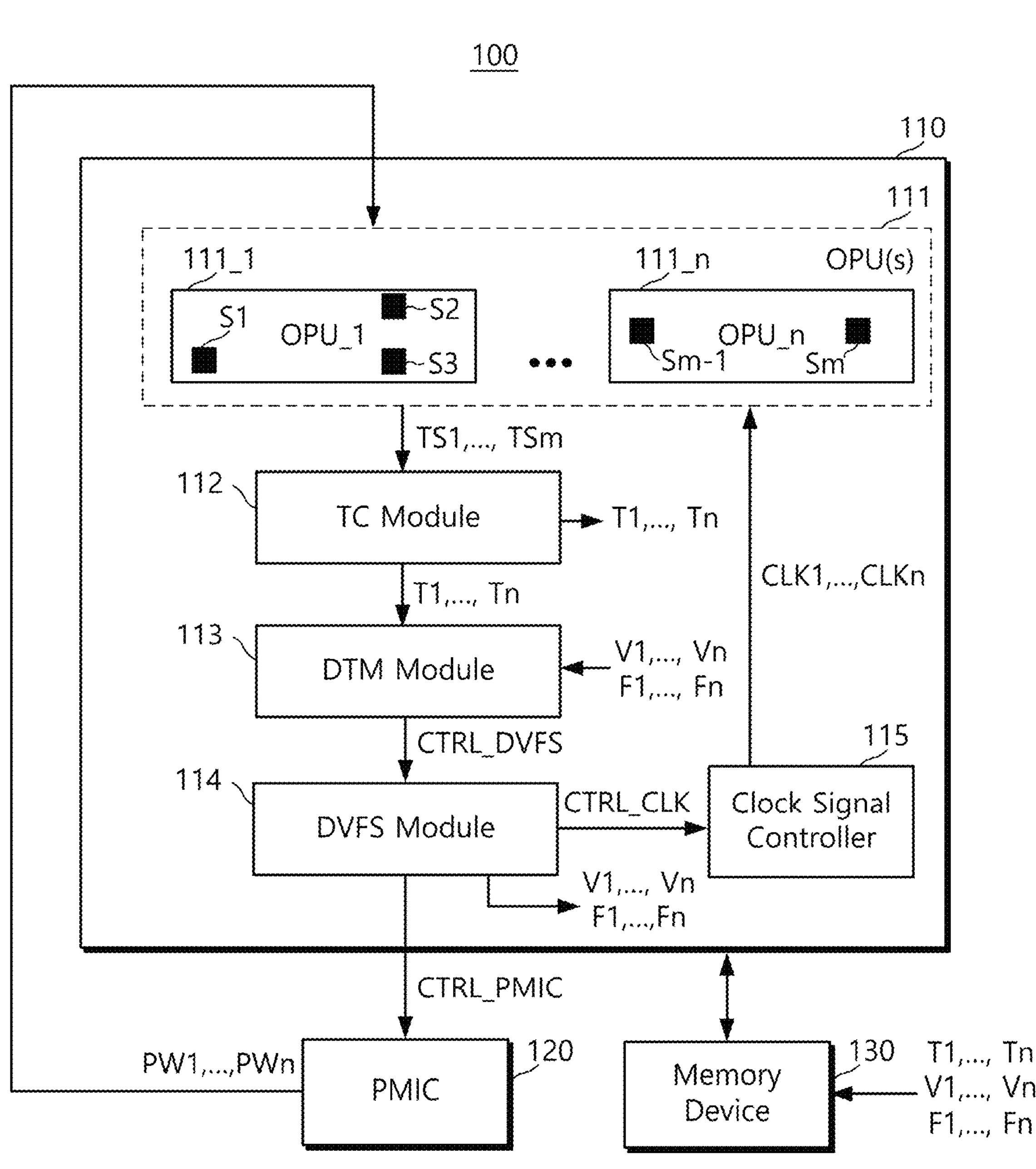
FIG. 1 is a block diagram illustrating a system-on-chip (SoC) according to some example embodiments.

Hereinafter, some example embodiments of the present inventive concepts will be described clearly and in detail so that those skilled in the art may easily carry out the present inventive concepts.

Accordingly, the drawings and description are to be regarded as illustrative in nature and not restrictive. Like reference numerals designate like elements throughout the specification. The sequence of operations or steps are not limited to the order presented in the claims or figures unless specifically indicated otherwise. The order of operations or steps may be changed, several operations or steps may be merged, a certain operation or step may be divided, and a specific operation or step may not be performed.

As used herein, the singular forms "a" and "an" are intended to include the plural forms as well, unless the context clearly indicates otherwise. Although the terms first, second, and the like may be used herein to describe various elements, components, steps and/or operations, these terms are only used to distinguish one element, component, step or operation from another element, component, step, or operation.

FIG. 1 is a block diagram illustrating a system-on-chip (SoC) according to some example embodiments.

A system-on-chip (SoC) 110 according to some example embodiments may control components of a computing system 100 to operate the computing system 100. The computing system 100 may be a mobile computing system. In some example embodiments, the SoC 110 may be an application processor (AP). The SoC 110 includes at least one operation processing unit (OPU(s)) 111. The SoC 110 may estimate a cooling coefficient and a heating coefficient based on a temperature, operating frequency, and driving voltage of the SoC 110. In some example embodiments to reach a target temperature, the SoC 110 may adjust the driving voltage and operating frequency provided to the SoC 110 based on the cooling and heating coefficients. For example, the SoC 110 according to some example embodiments may determine the driving voltage and the operating frequency to reach the target temperature without any hardware configuration to measure a surrounding temperature.

Referring to FIG. 1, the SoC 110 may include at least one operation processing unit (OPU(s)) 111, a temperature collection (TC) module 112, a temperature management (DTM) module 113, and a dynamic voltage and frequency scaling (DVFS) module 114, and a clock signal controller 115. The SoC 110 may communicate with a power management integrated circuit (PMIC) 120 and a memory device 130.

In some example embodiments, a unit or a module may mean hardware that may perform functions and operations according to their respective names, or computer program codes that may perform specific functions and operations. However, example embodiments are not limited thereto, and in some example embodiments the module may refer to an electronic recording medium loaded with computer program codes that may perform specific functions and operations, for example, a processing unit. For example, the module may mean a functional and/or structural combination of hardware for carrying out some example embodiments and/or software for driving the hardware. Software may be implemented as firmware.

The at least one OPU 111 may include a plurality of operation processing units (OPU_1 to OPU_n) 111_1 to 111_*n*. Each of the plurality of operation processing units (OPU_1 to OPU_n) 111_1 to 111_*n* may process an instruction based on a driving voltage and a clock signal provided/received. For example, each of the plurality of operation processing units (OPU_1 to OPU_n) 111_1 to 111_*n* may be one of a central processing unit (CPU), a graphics processing unit (GPU), a neural network processing unit (NPU), a digital signal processor (DSP), and an image signal processor (ISP), but example embodiments are not limited thereto. In some example embodiments, at least one of the plurality of operation processing units (OPU_1 to OPU_n) 111_1 to 111_*n* may be a central processing unit, and the central processing unit may include a plurality of cores. Some of the plurality of cores may have different sizes or computing capabilities.

At least one temperature sensor S1 to Sm may be arranged in each of the plurality of operation processing units (OPU_1 to OPU_n) 111_1 to 111_*n*. In some example embodiments, a plurality of temperature sensors S1 to Sm may be arranged in each of the plurality of operation processing units (OPU_1 to OPU_n) 111_1 to 111_*n*. The plurality of temperature sensors S1 to Sm, which are arranged in the plurality of operation processing units (OPU_1, . . . , OPU_n) 111_1 to 111_*n*, respectively, may be different from each other. For example, a number of temperature sensors S1, S2 and S3 arranged in the first processing unit (OPU_1) may be different from a number of temperature sensors Sm−1 and Sm arranged in the n-th processing unit (OPU_n). In some example embodiments, when a central processing unit includes a plurality of cores, temperature sensors are arranged on each of the cores, and the number of temperature sensors arranged may be different depending on the size or computing power of the cores.

The temperature sensors S1 to Sm may measure temperatures every specified time period and provide, transmit, or send measured temperature data TS1 to TSm to the temperature collection (TC) module 112.

According to some example embodiments, the provision of data and signals does not necessarily mean that the provider of the data and signals actively transmits, provides, or sends them to the receiver. In other words, the provision of data may include the receiver reading the data generated by the provider and stored by the provider. In some example embodiments, provision of data and signals may mean direct transmission of data and signals, but should be understood to include transmission of data and signals through other intermediate components.

The temperature collection (TC) module 112 may integrate temperature data TS1 to TSm for each functional block having the same or similar functions, and generate temperature data T1 to Tn for each thermal zone. For example, the temperature data TS1 to TSm may be converted into representative temperatures for each thermal zone. For example, the temperature data TS1, TS2, and TS3 of the first operation processing unit OPU_1 including a plurality of temperature sensors S1, S2 and S3 is converted into the temperature data T1 of a first thermal zone. The temperature collection (TC) module 112 may store the integrated temperature data TS1, TS2, and TS3 in the memory device 130. The temperature collection (TC) module 112 may provide, transmit, or send the integrated temperature data TS1, TS2, and TS3 to the temperature management (DTM) module 113. In some example embodiments, the highest temperature and the lowest temperature among the temperature data TS1, TS2, and TS3, or the average temperature of the temperature data TS1, TS2, and TS3 may be set as a representative temperature, but example embodiments are not limited thereto. The average temperature may be determined using various schemes such as arithmetic mean, harmonic mean, weighted mean, and the like. The average temperature may be calculated by reflecting the locations where each of the temperature sensors S1 to Sm is placed.

According to some example embodiments, the at least one operation processing unit (OPU(s)) 111 may be divided into operation processing units (OPU_1 to OPU_n) 111_1 to 111_*n*, respectively. Alternatively, in some example embodiments, at least one of the operation processing units (OPU_1 to OPU_n) 111_1 to 111_*n* may be divided into a plurality of functional blocks. The following example embodiments are explained on the assumption that the functional blocks are divided into the operation processing units (OPU_1 to OPU_n) 111_1 to 111_*n*, respectively.

The temperature management (DTM) module 113 according to some example embodiments may estimate a cooling coefficient and a heating coefficient of each of the operation processing units (OPU_1 to OPU_n) 111_1 to 111_*n* based on the temperature data TS1, TS2, and TS3, operating frequencies F1 to Fn, and driving voltages V1 to Vn of the operation processing units (OPU_1 to OPU_n) 111_1 to 111_*n* at a previous time. For example, the cooling coefficient and the heating coefficient may be estimated for each of the operation processing units (OPU_1 to OPU_n) 111_1 to 111_*n*.

In some example embodiments, the temperature management (DTM) module 113 may estimate the cooling coefficient and the heating coefficient based on matrix operations of the temperature data TS1, TS2, and TS3, the operating frequencies F1 to Fn and the driving voltages V1 to Vn of the operation processing units (OPU_1 to OPU_n) 111_1 to 111_*n* at the previous time.

In some example embodiments, the temperature management (DTM) module 113 may perform matrix operations based on floating point number operations. For example, the temperature management (DTM) module 113 may include a floating point operation unit or may use a floating point operation logic of one of the operation processing units (OPU_1 to OPU_n) 111_1 to 111_*n*. The floating point operation logic may be implemented in one of hardware, software, or a combination of hardware and software.

The temperature management (DTM) module 113 may determine an operating frequency of the clock signal to be provided to each of the operation processing units (OPU_1 to OPU_n) 111_1 to 111_*n* based on the cooling and heating coefficients of each of the operation processing units (OPU_1 to OPU_n) 111_1 to 111_*n*. The operating frequency may be an operating frequency for reaching the target temperature of each of the operation processing units (OPU_1 to OPU_n) 111_1 to 111_*n*. The operating frequency may be a frequency in a higher band or in a lower band than the operating frequency at the previous time. The target temperature may be preset for each of the operation processing units (OPU_1 to OPU_n) 111_1 to 111_*n*. According to some example embodiments, alternatively, the same target temperature may be set for all of the operation processing units (OPU_1 to OPU_n) 111_1 to 111_*n*.

The temperature management (DTM) module 113 may provide a control signal CTRL_DVFS to the DVFS module 114 to provide the clock signal of the determined operating frequency to each of the operation processing units (OPU_1 to OPU_n) 111_1 to 111_*n*. The control signal CTRL_DVFS may include information about the operating frequency determined by the temperature management (DTM) module 113. The control signal CTRL_DVFS may include information about a plurality of operating frequencies for the operation processing units (OPU_1 to OPU_n) 111_1 to 111_*n*.

The DVFS module 114 may determine the operating frequency of the clock signal and the driving voltage to be provided to each of the operation processing units (OPU_1 to OPU_n) 111_1 to 111_*n* based on the operating frequency determined by the temperature management (DTM) module 113. For example, the DVFS module 114 may determine the operating frequency of the clock signal and the driving voltage to be provided to each of the operation processing units (OPU_1 to OPU_n) 111_1 to 111_*n* with reference to a DVFS table, which is a lookup table in which a plurality of operating frequencies of the clock signal and a plurality of driving voltage levels are mapped in advance. The details according to some example embodiments will be described below with reference to FIG. 6.

The DVFS module 114 may provide control signals CTRL_PMIC and CTRL_CLK to the PMIC 120 and the clock signal controller 115 such that the determined clock signal and driving voltage are provided to each of the operation processing units (OPU_1 to OPU_n) 111_1 to 111_*n*. The clock signal controller 115 may generate the clock signal CLK1 to CLKn to be provided to each of the operation processing units (OPU_1 to OPU_n) 111_1 to 111_*n* based on the control signal CTRL_CLK. In some example embodiments, the clock signal controller 115 may include a phase locked loop (PLL) or a delayed locked loop (DLL).

The DVFS module 114 may store the determined clock signal and driving voltage together with time information in the memory device 130. The DVFS module 114 may store the clock signal and the driving voltage of each of the operation processing units (OPU_1 to OPU_n) 111_1 to 111_*n* in the memory device 130. Time information may be absolute time information or relative time information that may distinguish between time periods. According to some example embodiments, the DVFS module 114 may store only a preset number of clock signals and driving voltages in the memory device 130. For example, clock signals and driving voltages before a specified time (or a specified number of times) from the current time may be deleted, and clock signals and driving voltages that are within a specified time (or a specified number of times) from the current time may be stored in the memory device 130. The clock signal and driving voltage stored in the memory device 130 may be used to estimate the cooling coefficient and heating coefficient of the temperature management module 113.

The SoC 110 according to some example embodiments may determine the operating frequency and driving voltage of each of the operation processing units (OPU_1 to OPU_n) 111_1 to 111_*n* to reach the target temperature based only on the temperature, operating frequency, and driving voltage of each of the operation processing units (OPU_1 to OPU_n) 111_1 to 111_*n*. Therefore, according to some example embodiments, there is no need for separate hardware to measure the ambient temperature. For example, the SoC 110 according to some example embodiments may not utilize separate hardware to measure the ambient temperature. In some example embodiments, the SoC 110 does not require estimation of various parameters or domain conversion during intermediate calculation for temperature management, but uses cooling coefficients and heating coefficients estimated based on a small number/set/amount of data. For example, the SoC 110 may not estimate various parameters or domain conversion during intermediate calculation for temperature management, but may be configured to use the cooling coefficients and the heating coefficients estimated based on a small number/set/amount of data. Accordingly, the SoC 110 may quickly and stably control the temperature of each of the operation processing units (OPU_1 to OPU_n) 111_1 to 111_*n*.

Figure 2:
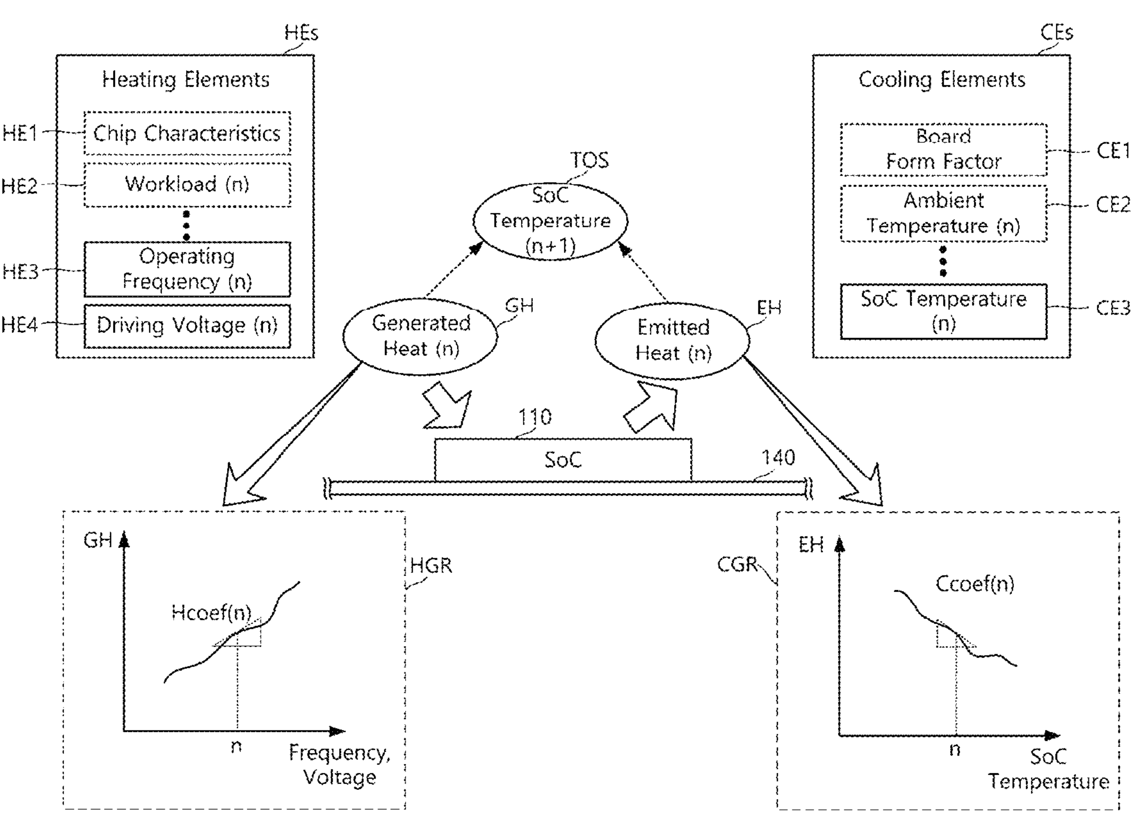
FIG. 2 is a diagram illustrating an example of a thermal model used to control the temperature of a SoC according to some example embodiments.

FIG. 2 is a diagram illustrating an example of a thermal model used to control the temperature of a SoC according to some example embodiments. The SoC of FIG. 2 may correspond to the SoC 110 of FIG. 1. The example of a thermal model according to some example embodiments will be described with reference to FIGS. 1 and 2. In the description of the thermal model with reference to FIGS. 1 and 2, it is assumed that the SoC 110 is illustratively composed of one functional block, for example, one thermal zone.

It is assumed in a thermal model according to some example embodiments that the current temperature at the current time point (n) of the SoC 110 is determined based on a heating amount GH, which is the amount of heat generated, and a cooling amount EH, which is the amount of heat dissipated. Heating elements HEs that affect the heating amount GH of the SoC 110 may include the structural and material characteristics, for example the chip characteristics HE1, of the SoC 110, a workload HE2 assigned to the SoC 110, an operating frequency HE3 of the SoC 110, and an driving voltage HE4 of the SoC 110. Cooling elements CEs that affect the cooling amount EH of the SoC 110 may include a board form factor CE1 in which the SoC 110 is implemented, an ambient temperature CE2 of the SoC 110, and a temperature CE3 of the SoC 110. But example embodiments are not limited thereto, and the heating elements HEs and cooling elements CEs may include other elements not shown in FIG. 2.

Among the heating elements HEs, elements that may be dynamically controlled by the temperature management module 113 may include the operating frequency HE3 and driving voltage HE4 of the SoC 110. Among the cooling elements CEs, the elements that may be dynamically controlled or accurately calculated by the temperature management module 113 may include the temperature CE3 of the SoC 110. For example, the temperature CE3 of the SoC 110 may be identified through the temperature collection (TC) module 112, and the operating frequency HE3 and driving voltage HE4 of the SoC 110 may be controlled through the DVFS module 114.

The cooling amount EH of the SoC 110 tends to be proportional to the temperature CE3 of the SoC 110. In some example embodiments, a graph CGR of the cooling amount EH, a cooling coefficient Ccoef may refer to the temperature drop rate of the SoC 110 due to the cooling elements CEs that affect the temperature drop of the SoC 110. The heating amount GH of the SoC 110 tends to be proportional to the operating frequency HE3 and driving voltage HE4 of the SoC 110. In some example embodiments, a graph HGR of the heating amount GH, a heating coefficient Hcoef may refer to the temperature increase rate of the SoC 110 due to the heating elements HEs that affect the temperature rise of the SoC 110. Accordingly, the heating coefficient Hcoef and cooling coefficient Ccoef may change over time.

According to some example embodiments, when the entire time section in which the SoC 110 operates is equally divided into unit time intervals and the unit time is very short, it may be assumed that the values of variables that affect the heating coefficient Hcoef and cooling coefficient Ccoef in the adjacent time sections are the same. For example, it may be assumed that the values of the heating elements HEs and cooling elements CEs are the same in adjacent time sections. This may also be applied to heating elements and cooling elements not shown in FIG. 2.

Therefore, in some example embodiments, when it is assumed that the values of heating elements HEs and cooling elements CEs at the current time point (n) are equal to the values of heating elements HEs and cooling elements CEs at a next time point (n+1), the heating coefficient Hcoef(n) and cooling coefficient Ccoef(n) at the current time point (n) may also be the same as those at the next time point (n+1).

Figure 3:
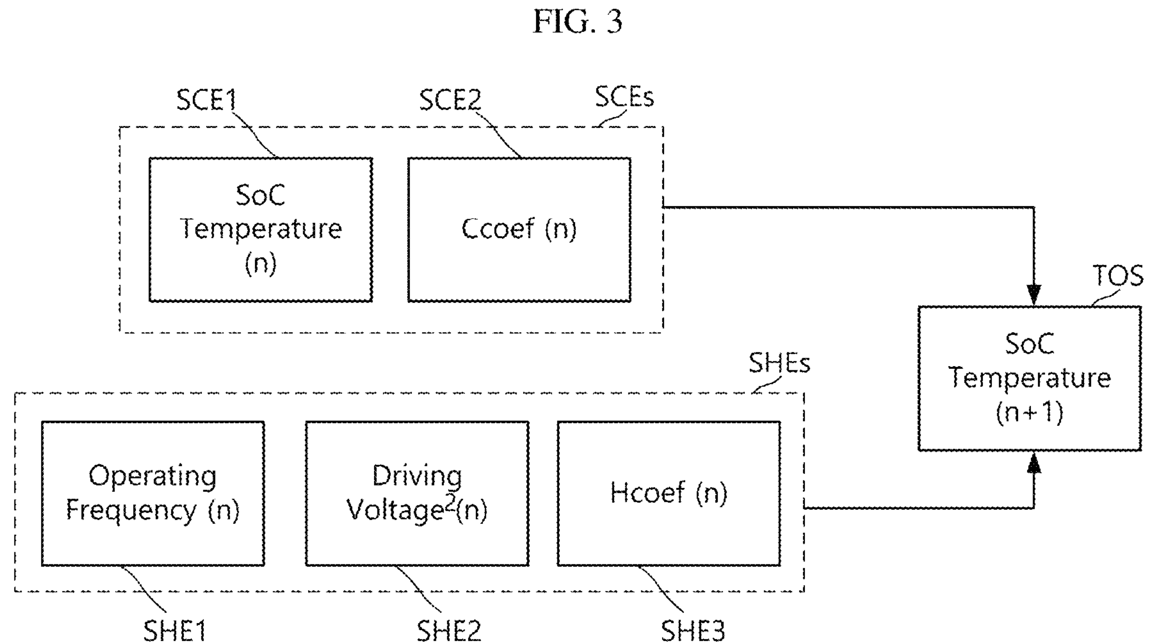
FIG. 3 is a diagram illustrating a thermal model used to control the temperature of a SoC according to some example embodiments.

FIG. 3 is a diagram illustrating a thermal model used to control the temperature of a SoC according to some example embodiments. The SoC of FIG. 3 may correspond to the SoC 110 of FIGS. 1 and 2. A thermal model according to some example embodiments will be described with reference to FIGS. 1, 2, and 3.

Referring to the example of the thermal model in FIG. 2, the current temperature of the SoC 110 at the current the point (n) may be based on the heating amount GH and the cooling amount EH, and the heating amount GH and the cooling amount EH may be determined by the heating coefficient Hcoef(n), the cooling coefficient Ccoef(n), the heating elements HEs, and the cooling elements CEs.

According to some example embodiments, when the example of the thermal model of FIG. 2 is simplified to dynamically controllable elements or accurately measurable elements in the system, the thermal model may be the same as the thermal model of FIG. 3. Referring to FIG. 3, in some example embodiments, it may be assumed that a temperature TOS of the SoC 110 at the next time point (n+1) is due to the influence of the simplified heating amount and simplified cooling amount at the current time point (n). In some example embodiment, heating elements SHEs of the simplified heating amount include operating frequency SHE1, driving voltage SHE2, and heating coefficient (Hcoef(n)) SHE3 of the SoC 110 at the current time (n), and cooling elements SCEs of the simplified cooling amount include a temperature SCE1 and a cooling coefficient (Ccoef(n)) SCE2 of the SoC 110 at the current time point (n).

According to some example embodiments, variables affecting cooling and heating of the SoC 110 may be significantly greater than those in the simplified thermal model of FIG. 3. However, according to some example embodiments, even when the simplified heating elements SHEs and the simplified cooling elements SCEs described with reference to FIG. 3 are applied to the SoC 110, it was experimentally confirmed that an error occurring at a very short unit time interval is negligible at the level of the SoC 110.

The thermal model of FIG. 3 may be expressed as following Equation 1.

$$T_n \times C + F_n \times V_n^2 \times H = T_{n+1} \quad \text{(Equation 1)}$$

In Equation 1, $T_n$ represents the temperature SCE1 of the SoC 110 at a specific time point (n), C represents the cooling coefficient (Ccoef(n)) SCE2, $F_n$ represents the operating frequency SHE1 of the SoC 110, $V_n$ represents the driving voltage SHE2 of the SoC 110, and H represents the heating coefficient (Hcoef(n) SHE3. $T_{n+1}$ represents the temperature of the SoC 110 at the next time point (n+1).

According to some example embodiments, when Equation 1 is expanded to a plurality of time points, Equation 1 may be expressed as the matrix operation of Equation 2.

$$\begin{bmatrix} T_{n-2} & F_{n-2}V_{n-2}^2 \\ T_{n-1} & F_{n-1}V_{n-1}^2 \end{bmatrix}\begin{bmatrix} C \\ H \end{bmatrix} = \begin{bmatrix} T_{n-1} \\ T_n \end{bmatrix} \quad \text{(Equation 2)}$$

In Equation 2, subscripts n−2, n−1 and n represent time points, respectively.

Therefore, in some example embodiments, when the temperature ($T_{n-2}$, $T_{n-1}$), the operating frequency ($F_{n-2}$, $F_{n-1}$), and the driving voltage $$(V_{n-2}^2, V_{n-1}^2)$$

of the SOC 110 at two time points (n−1, n−2) before the current time point (n), the temperature ($T_{n-1}$) at the previous time point (n−1), and the temperature ($T_n$) at the current time point (n) are known, the cooling coefficient (C) and the heating coefficient (H) may be determined.

Based on the example of the thermal model described with reference to FIG. 2, the value of each of the heating elements HEs and the cooling elements CEs, the heating coefficient (Hcoef(n)), and the cooling coefficient (Ccoef(n)) are the same as those at time sections adjacent to each other. Accordingly, in some example embodiments, the cooling coefficient (C) and the heating coefficient (H) of the SoC 110 determined at the current time point (n) may be estimated to be the same at those at the next time point (n+1).

As a result, because the temperature (In) at the current time point (n) may be measured, the target usage power $$(F_n \times V_n^2)$$

of the SoC 110 to reach the target temperature ($T_{n+1}$) of the SoC 110 at the next time point (n+1) may be determined based on the cooling coefficient (C) and the heating coefficient (H) according to Equation 1.

Figure 4:
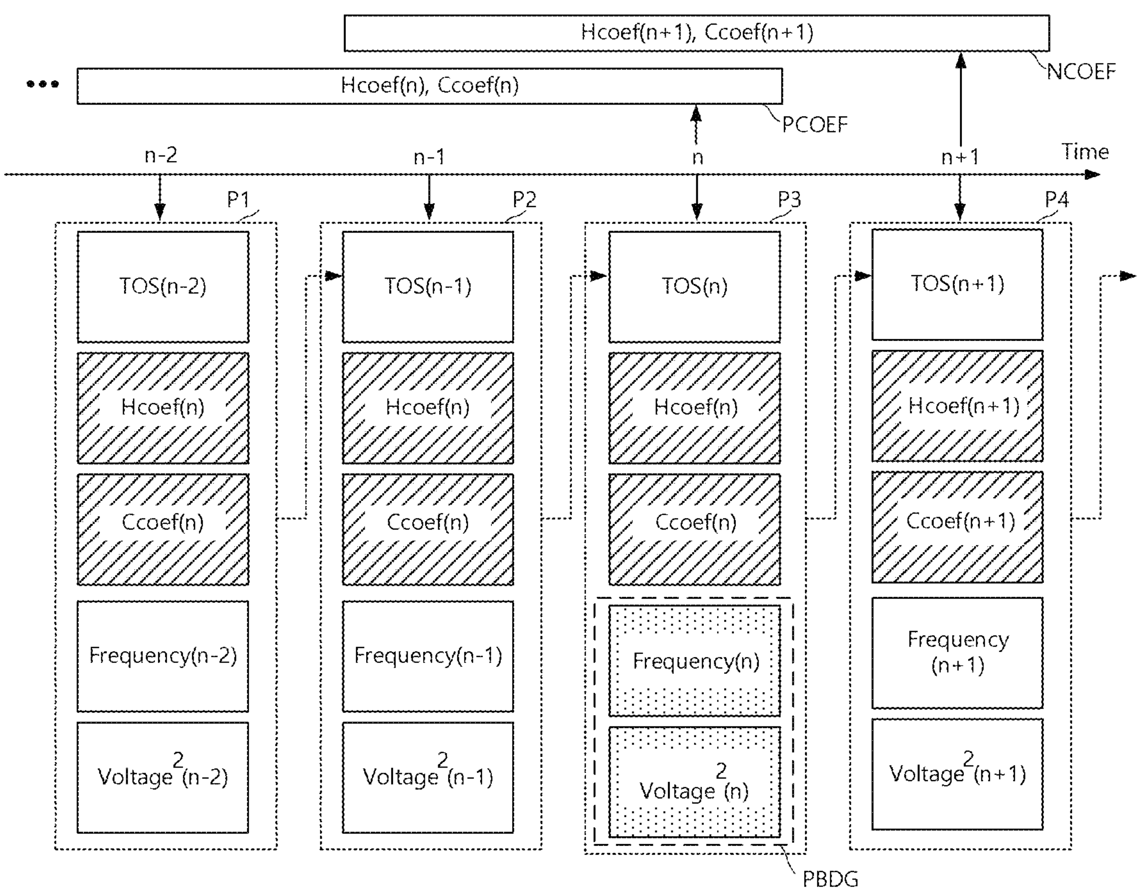
FIG. 4 is a diagram illustrating in detail a method of determining a driving frequency and a driving voltage to reach a target temperature based on a thermal model of a SoC according to some example embodiments.

FIG. 4 is a diagram illustrating in detail a method of determining a driving frequency and a driving voltage to reach a target temperature based on a thermal model of a SoC according to some example embodiments. The SoC of FIG. 4 may correspond to the SoC 110 of FIGS. 1, 2, and 3. With reference to FIGS. 1, 2, 3, and 4, a method of determining a driving frequency and a driving voltage for reaching a target temperature based on a thermal model according to some example embodiments will be described.

Referring to FIG. 4, a temperature (TOS(n−1)) at the previous time point (n−1) before the current time point (n) is determined by cooling/heating elements P1 at a previous time point (n−2). In some example embodiments, a temperature (TOS(n)) at the current time point (n) is determined by cooling/heating elements P2 at the previous time point (n−1). As a result, in some example embodiments, a temperature (TOS(n+1)) at the next time point (n+1) may be determined by a cooling/heating elements P3 at the current time point (n). Therefore, when the current temperature (TOS(n)), the cooling coefficient (Ccoef(n)), and the heating coefficient (Hcoef(n)) among the cooling/heating elements P3 at the current time point (n) are known, and the target temperature (TOS(n+1)) of the future time point (n+1) is applied to Equation 1 described above with reference to FIG. 3, and it is possible to determine the target usage power, $$(F_n \times V_n^2)$$

of the SoC 110 to reach the target temperature (TOS(n+1)).

Referring to FIG. 4, the SoC 110 may receive the operating frequencies (Frequency (n−2), Frequency (n−1)) and the driving voltages (Voltage (n−2), Voltage (n−1)) of the SoC 110 at two time points (n−2, n−1) before the current time point (n) from the memory device 130 of FIG. 1. The SoC 110 may receive the temperature (TOS(n−1)) of the SoC 110 at the previous time point (n−1) from the memory device 130 of FIG. 1, and receive the current temperature (TOS(n−1)) from the temperature collection (TC) module 112 of FIG. 1.

Based on the thermal model described with reference to FIGS. 2 and 3, it is assumed that the cooling coefficient (Ccoef(n)) and the heating coefficient (Hcoef(n)) of the SoC 110 at the current time point (n) and two time points (n−2, n−1) before the current time point (n) are the same. Accordingly, in some example embodiments, the cooling coefficient (Ccoef(n)) and the heating coefficient (Hcoef(n)) may be determined based on the thermal model described with reference to FIG. 3.

As a result, the SoC 110 may determine the target usage power $$(F_n \times V_n^2)$$

by applying the current temperature (TOS(n)), the cooling coefficient (Ccoef(n)), the heating coefficient (Hcoef(n)), and the target temperature (TOS(n+1)) to Equation 1. The SoC 110 may determine the target operating frequency ($F_n$) based on the determined target usage power $$(F_n \times V_n^2)$$

and the DVFS table.

Referring to FIG. 4, the SoC 110 may determine the target operating frequency ($f_{n+1}$) to be used in the SoC 110 at the next time point (n+1) on the assumption that the cooling coefficient (Ccoef(n)) and the heating coefficient (Hcoef(n)) at the current time point (n) and previous two time points (n−2, n−1) are the same (PCOEF). Similarly, the SoC 110 may determine the target operating frequency ($F_{n+2}$) to be used in the SoC 110 at the next time point (n+2) on the assumption that the cooling coefficient (Ccoef(n+1)) and the heating coefficient (Hcoef(n+1) at the next time point (n+1) are the same (NCOEF) as those at the previous two time points (n−1, n). The SoC 110 may adjust the operating frequency provided to the SoC 110 by continuously repeating the same operation. Accordingly, in some example embodiments, the operating frequency and the driving voltage may be dynamically determined to suit various situations of the SoC 110. According to some example embodiments, the target temperature at each time point may be set the same or may be set differently in some situations.

Figure 5:
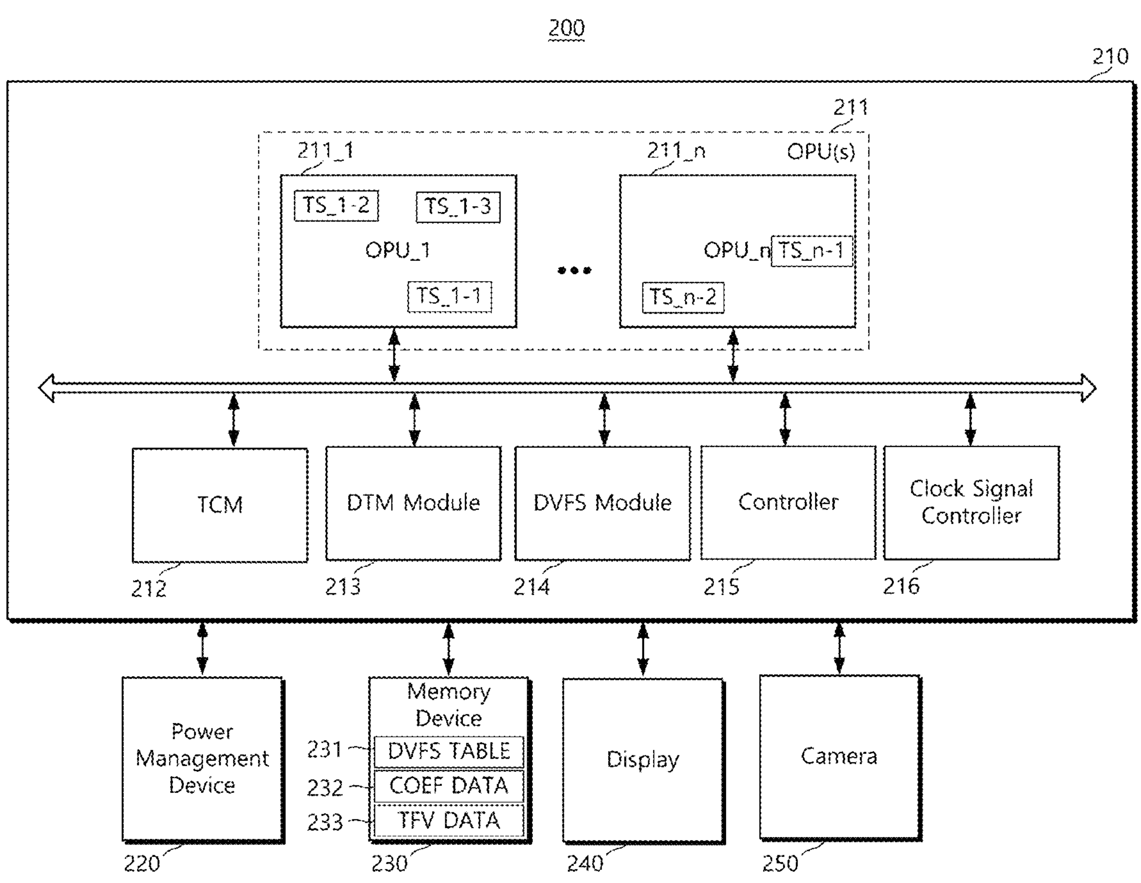
FIG. 5 is a block diagram illustrating in detail the configuration of a SoC according to some example embodiments.

FIG. 5 is a block diagram illustrating in detail the configuration of a SoC 210 according to some example embodiments. The SoC 210 of FIG. 5 may correspond to the SoC 110 described with reference to FIG. 1. The SoC 210 of FIG. 5 may determine an operating frequency of the SoC 210 appropriate for the target temperature based on the thermal model described with reference to FIGS. 2 to 4. Detailed description of parts that overlap or are similar to those described with reference to FIGS. 1 to 4 will be omitted.

Referring to FIG. 5, a computing system 200 may include the SoC 210, a power management device 220, a memory device 230, a display device 240, and a camera 250.

The SoC 210 may include at least one operation processing unit (OPU(s)) 211, a temperature collection module (TCM) 212, a temperature management (DTM) module 213, a DVFS module 214, a controller 215, and a clock signal controller 216. The SoC 210 may communicate with the power management device 220, the memory device 230, the display device 240, and the camera 250.

Each (OPU_1 to OPU_n) 211_1 to 211_*n* of the operation processing units (OPU(s)) 211 may include at least one temperature sensor (TS_1-1, TS_1-2, TS_1-3, . . . , TS_n−1, TS_n−2). Each of the temperature sensors (TS_1-1, TS_1-2, TS_1-3, . . . , TS_n−1, TS_n−2) may measure a temperature and provide the measured temperature to the temperature collection module (TCM) 212. The temperature collection module (TCM) 212 may convert the temperature to a representative temperature of each (OPU_1 to OPU_n) 211_1 to 211_*n* of the operation processing units (OPU(s)) 211 based on the measured temperatures, and may provide the representative temperature to the temperature management (DTM) module 213. In some example embodiments, in addition to the temperature sensors (TS_1-1, TS_1-2, TS_1-3, TS_n−1, TS_n−2) shown in FIG. 5, temperature sensors may be arranged in various locations of the SoC 210. Temperature sensors may be arranged inside or outside the printed circuit board (PCB) of the SoC 210 and arranged on the controller 215 for controlling peripheral devices, such as the display device 240, the camera 250, and the like, but example embodiments are not limited thereto. For example, there may be a plurality of controllers 215, and a temperature sensor may be separately arranged in each controller 215.

The temperature management (DTM) module 213 according to some example embodiments may estimate the cooling coefficient and heating coefficient of the SoC 210 based on the representative temperatures of each (OPU_1 to OPU_n) 211_1 to 211_*n* of the operation processing units (OPU(s)) 211 and thermal model described with reference to FIGS. 2 to 4. The SoC 210 may estimate the cooling coefficient and the heating coefficient by using representative temperature, operating frequency and driving voltage data (TFV DATA) 233 stored in the memory device 230 at a previous time point.

The cooling coefficients and heating coefficients estimated at each of a plurality of time points may be stored in the memory device 230 as cooling coefficient and heating coefficient data (COEF DATA) 232. The memory device 230 may be a volatile memory device arranged outside the SoC 210. The memory device 230 may be implemented as double data rate synchronous DRAM (DDR SDRAM), high bandwidth memory (HBM), hybrid memory cube (HMC), dual in-line memory module (DIMM), Optane DIMM, and/or non-volatile DIMM (NVDIMM), static RAM (SRAM), cache, or tightly coupled memory (TCM). Although the example embodiment illustrated in FIG. 3 is described on the assumption that the memory device 230 is placed outside SoC 210, some data may be loaded into an internal memory device (not shown) inside the SoC 210. The internal memory device may be, for example, a cache.

The temperature management (DTM) module 213 may determine the operating frequency of the SoC 210 based on the estimated cooling coefficient and heating coefficient, the current temperature of the SoC 210, a DVFS table 231 stored in the memory device 230, and the target temperature.

The DVFS module 214 may determine the frequency and driving voltage of the clock signal to be provided to the SoC 210 based on the operating frequency provided from the DVFS table 231 and the temperature management (DTM) module 213.

The DVFS module 214 may store the frequency of a clock signal and the driving voltage provided to each (OPU_1 to OPU_n) 211_1 to 211_*n* of the operation processing units (OPU(s)) 211 at the plurality of time points in the memory device 230 together with the representative temperature as the representative temperature, operating frequency and driving voltage data (TFV DATA) 233.

In some example embodiments, the representative temperature, operating frequency and driving voltage data (TFV DATA) 233 may be stored as much as a preset number of time points. Accordingly, the representative temperature, operating frequency and driving voltage data (TFV DATA) 233 may be updated over time.

The SoC 210 may operate using the driving voltage provided from the power management device 220 and the clock signal provided from the clock signal controller 216.

FIG. 6 is a diagram illustrating a DVFS table 300 of a SoC according to some example embodiments. The DVFS table 300 of FIG. 6 may correspond to the DVFS table 231 of FIG. 5. A method of determining the operating frequency of the SoC 210 based on the DVFS table 300 by the temperature management (DTM) module 213 of FIG. 5, according to some example embodiments, will be described with reference to FIGS. 5 and 6.

Referring to FIG. 6, the DVFS table 300 according to some example embodiments may include information about an operating frequency 320 and a driving voltage 330 corresponding to each of a plurality of system-on-chip levels 310.

The temperature management (DTM) module 213 of FIG. 5 may determine the target usage power $$(F_n \times V_n^2)$$

of the SoC 210 to reach the target temperature at the next time point based on the estimated cooling coefficient and heating coefficient and Equation 1 described with reference to FIG. 3. The temperature management (DTM) module 213 may determine the system-on-chip level 310 corresponding to the target usage power $$(F_n \times V_n^2)$$

based on the operating frequency 320 and the driving voltage 330 of the DVFS table 300. For example, when the target usage power $$(F_n \times V_n^2)$$

corresponds to the used power of the level 3 of the system-on-chip level 310 in the DVFS table 300, the temperature management (DTM) module 213 may determine the operating frequency of 1.1 GHz mapped to the level 3 of the system-on-chip level 310 as the operating frequency of the SoC 210. The temperature management (DTM) module 213 may provide information about the operating frequency of 1.1 GHz to the DVFS module 214 of FIG. 5.

In some example embodiments, when the system-on-chip levels 310 corresponding to an operating frequency of 1.1 GHz or less provided from the DVFS table 300 are level 3, level 2, level 1, and level 0, the DVFS module 214 of FIG. 5 may select level 3 which is the highest usage power. The DVFS module 214 may provide information about the operating frequency of 1.1 GHz and the driving voltage of 600 mV mapped to the system-on-chip level 310 of level 3 to the clock signal controller 216 and the power management device 220 of FIG. 5, respectively.

Figure 7:
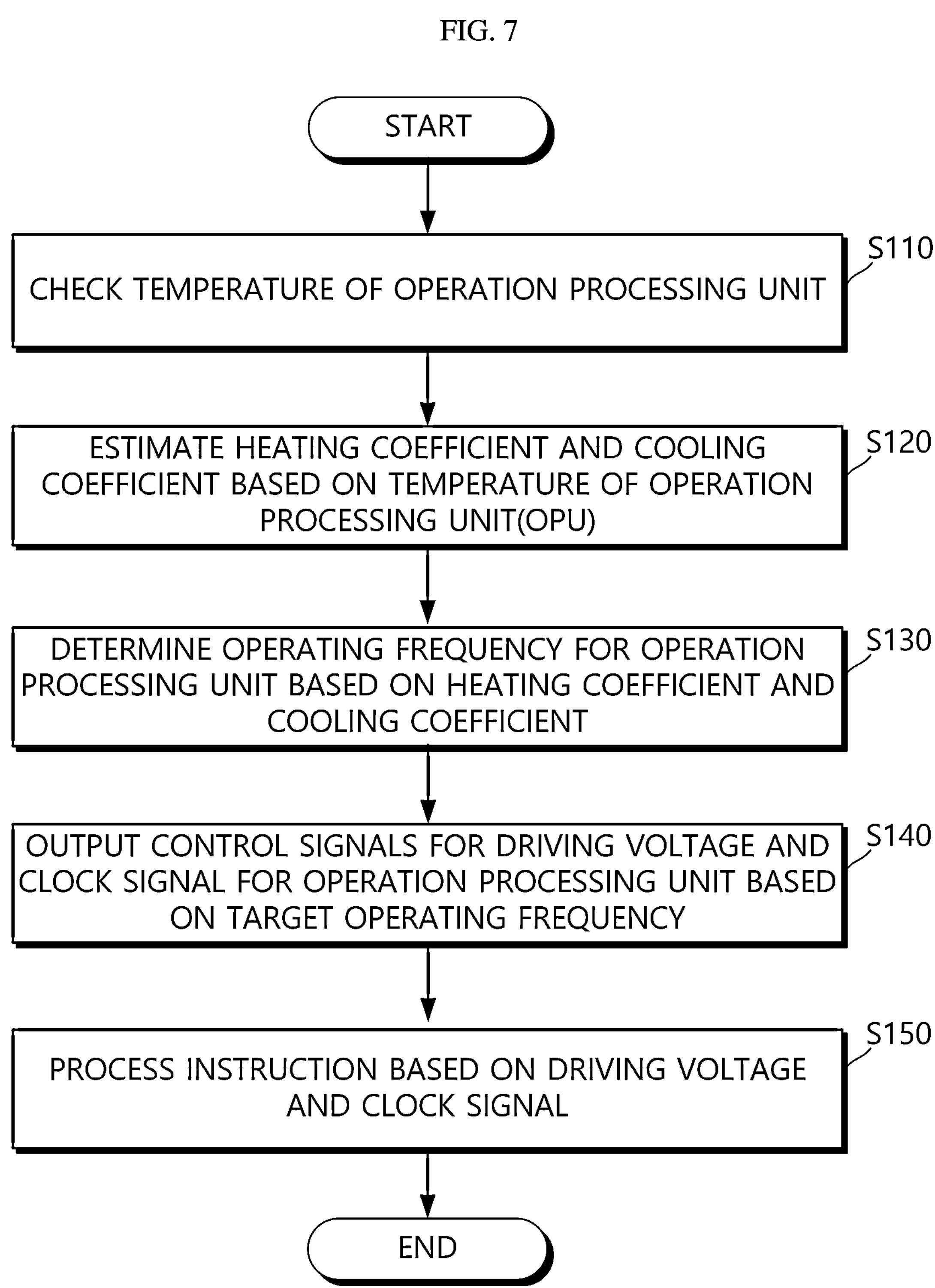
FIG. 7 is a flowchart illustrating a method of operating a system-on-chip according to some example embodiments.

FIG. 7 is a flowchart illustrating a method of operating a system-on-chip according to some example embodiments. The SoC may correspond to the SoC 110 of FIG. 1 and the SoC 210 of FIG. 5. Detailed description of overlapping or similar parts with reference to FIGS. 1 to 6 will be omitted.

In operation S110, the SoC 110 illustrated in FIG. 1 or the SoC 210 illustrated in FIG. 5 may check the temperature of each of a plurality of operation processing units. The temperature of each of the plurality of operation processing units may be a value obtained by converting temperatures measured by a plurality of temperature sensors into a representative temperature of the same thermal zone. In some example embodiments, the plurality of operation processing units may be divided into different thermal zones. In some example embodiments, each of a plurality of cores arranged within the same processing unit may be divided into the same thermal zone or may be divided into different thermal zones.

In operation S120, the SoC 110 or the SoC 210 may estimate the cooling coefficient and the heating coefficient of each of the plurality of operation processing units based on the temperature of each of the plurality of operation processing units. The cooling coefficient and the heating coefficient of one operation processing unit may be different from those of another operation processing unit. The cooling coefficient and the heating coefficient of each of the plurality of operation processing units may be based on the current temperature, the temperature at the previous time point, the driving frequency at the previous time point, and the driving voltage at the previous time point of each of the plurality of operation processing units. There may be multiple previous time points. The cooling coefficient and the heating coefficient of each of the plurality of operation processing units may be estimated based on Equation 1 and Equation 2 described with reference to FIG. 3.

In some example embodiments, when the inverse matrix of the leftmost matrix of Equation 2 does not exist, the cooling coefficient and the heating coefficient estimated at a previous time point may be used as the cooling coefficient and the heating coefficient. For example, when the determinant of the leftmost matrix has a value of 0 (zero), the SoC 110 or 210 may use the cooling coefficient and the heating coefficient estimated at a previous time point.

In some example embodiments, the SoC 110 or the SoC 210 may selectively adjust the cooling coefficient and the heating coefficient estimated based on the cooling coefficient and heating coefficient estimated at a previous time point. For example, the average value of the coefficients estimated at the previous time point and the coefficients estimated at the current time point may be determined as the final cooling coefficient and heating coefficient. The average value may be one of the arithmetic mean, harmonic mean, and weighted mean, or may be calculated by other methods. In the case of the weighted average, a weighted average value that further reflects one of the coefficients estimated at the current time point and the coefficients estimated at the previous time point according to the operating policy may be determined as the final cooling coefficient and heating coefficient.

In operation S130, the SoC 110 or the SoC 210 may determine the operating frequency for each of the plurality of operation processing units based on the estimated cooling coefficient and heating coefficient. The SoC 110 or the SoC 210 may determine the operating frequency based on the target usage power used by each of the plurality of operation processing units to reach a preset target temperature. The target usage power may be estimated based on Equation 1 described with reference to FIG. 3.

In operation S140, the SoC 110 or the SoC 210 may determine the operating frequency of the clock signal and the driving voltage to be provided to each of the plurality of operation processing units based on the determined operating frequency and the DVFS table. The SoC 110 or 210 may output a control signal for adjusting the driving voltage and a control signal for adjusting the clock signal provided to each of the plurality of operation processing units based on the operating frequency of the determined clock signal and the driving voltage.

In operation S150, the SoC 110 or the SoC 210 may operate and may process an instruction based on the driving voltage provided by the power management device based on the control signal for adjusting the driving voltage and the clock signal provided by a clock signal controller based on a control signal for adjusting the clock signal.

Figure 8:
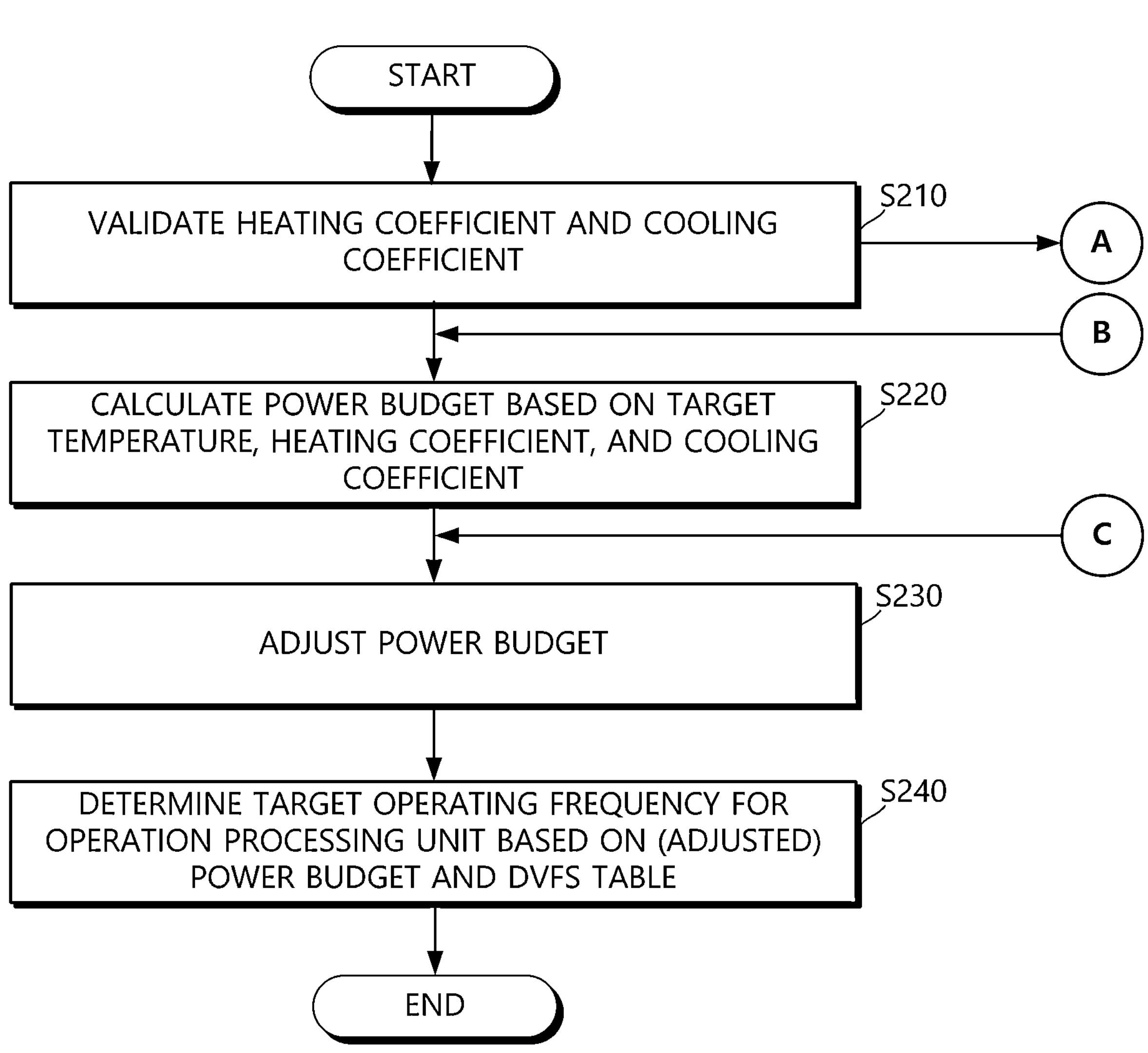
FIG. 8 is a flowchart illustrating a method of determining the operating frequency of a system-on-chip (SoC) according to some example embodiments.

FIG. 8 is a flowchart illustrating a method of determining the operating frequency of a system-on-chip (SoC) according to some example embodiments. The operating frequency may be a frequency corresponding to the target usage power used to reach the target temperature for each of the plurality of operation processing units. The SoC may correspond to the SoC 110 of FIG. 1 and the SoC 210 of FIG. 5. A method of determining the operating frequency of the SoC described with reference to FIG. 8 may correspond to operation S130 of FIG. 7. Detailed descriptions of parts that overlap or are similar to those described with reference to FIGS. 1 to 7 will be omitted.

In operation S210, the SoC 110 or the SoC 210 may verify the validity of the cooling coefficient and the heating coefficient estimated for each of the plurality of operation processing units. For example, the SoC 110 or the SoC 210 may validate the heating coefficient and the cooling coefficient estimated for each of the plurality of operation processing units. A method of verifying the validity of the cooling coefficient and the heating coefficient, according to some example embodiments, will be described below with reference to FIG. 9. Operation S210 may be performed selectively. For example, operation S210 may or may not be performed depending on an example embodiment.

In operation S220, the target usage power (e.g., power budget) is calculated based on the cooling coefficient, heating coefficient, and target temperature determined to be valid. For example, the SoC 110 or the SoC 210 may calculate the target usage power/power budget based on the target temperature, heating coefficient, and cooling coefficient. The target usage power may be calculated for each of the plurality of operation processing units. The SoC 110 or SoC 210 may calculate the target usage power/power budget based on <Equation 1> described above.

The target usage power may be the maximum power that may be used by each of the plurality of operation processing units of the SoC 110 or SoC 210 to reach the target temperature. The target usage power may be referred to as a power budget for reaching the target temperature of the SoC 110 or SoC 210.

In operation S230, the SoC 110 or SoC 210 may adjust the power budget. For example, depending on the operation policy of the SoC 110 or SoC 210, the calculated power budget may be adjusted actively or stably such that the SoC 110 or SoC 210 reaches the set temperature. A method of adjusting the power budget, according to some example embodiments, will be described below with reference to FIGS. 11 to 13. Operation S230 may be performed selectively. For example, operation S230 may or may not be performed depending on an example embodiment.

According to some example embodiments, the SoC 110 or SoC 210 may determine the operating frequency based on the calculated power budget without adjusting the power budget.

In operation S240, the SoC 110 or SoC 210 may determine the target operating frequency of the SoC 110 or SoC 210 based on the calculated power budget (or adjusted power budget) and the DVFS table. The DVFS table may correspond to the DVFS table 300 of FIG. 6.

The SoC 110 or SoC 210 may determine a SoC level corresponding to the calculated power budget in the DVFS table 300, and determine the operating frequency mapped to the determined SoC level as the operating frequency of the SoC 110 or SoC 210.

Figure 9:
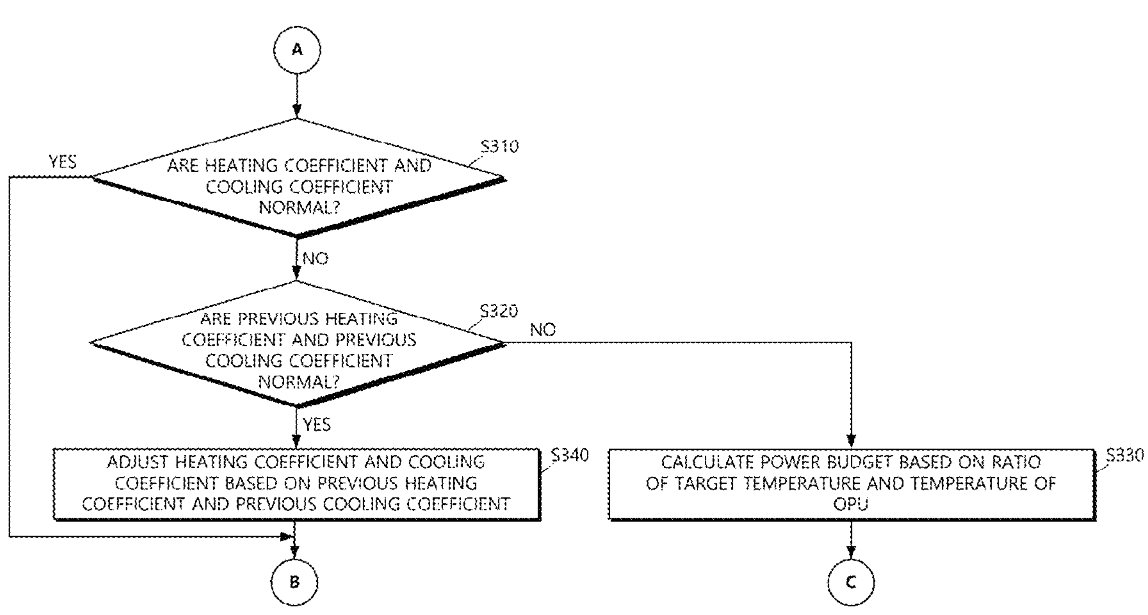
FIG. 9 is a flowchart illustrating a method of verifying a cooling coefficient and a heating coefficient of a system-on-chip (SoC) according to some example embodiments.

FIG. 9 is a flowchart illustrating a method of verifying a cooling coefficient and a heating coefficient of a system-on-chip (SoC) according to some example embodiments. The operating frequency may be a frequency corresponding to the target usage power used to reach the target temperature for each of the plurality of operation processing units. The SoC may correspond to the SoC 110 of FIG. 1 and the SoC 210 of FIG. 5.

Referring to FIG. 9, in operation S310, the SoC 110 or SoC 210 may check whether the heating coefficient and the cooling coefficient are normal. According to some example embodiments, when at least one of the heating coefficient and the cooling coefficient is abnormal, operation S320 may be performed. According to some example embodiments, when the heating coefficient and cooling coefficient are normal, the SoC 110 or SoC 210 may complete the verification operation and return to operation S220 of FIG. 8 to calculate the power budget.

In some example embodiments, the SoC 110 or SoC 210 may check whether the heating coefficient and cooling coefficient are within a preset range, and check the sign of the heating coefficient and/or the sign of the cooling coefficient. For example, when the heating coefficient is negative or the cooling coefficient is positive, the SoC 110 or SoC 210 may determine that the heating coefficient and the cooling coefficient are abnormal. Alternatively, in some example embodiments, the SoC 110 or SoC 210 may determine whether the absolute values of the heating coefficient and cooling coefficient are within a preset range, or whether the heating coefficient and cooling coefficient are within a preset range from the values estimated at a previous time point.

In some example embodiments, the SoC 110 or SoC 210 may map the verification results of the heating coefficient and cooling coefficient to the estimated values of the heating coefficient and cooling coefficient and store them as cooling coefficient and heating coefficient data in a memory device. The cooling coefficient and heating coefficient data may correspond to the cooling coefficient and heating coefficient data (COEF DATA) 232 described with reference to FIG. 5.

In operation S320, the SoC 110 or SoC 210 may check whether the heating coefficient and cooling coefficient estimated at the previous time point are normal. To determine whether the heating coefficient and cooling coefficient estimated at a previous time point are normal, the method described in operation S320 may be used, or the verification result included in the cooling coefficient and heating coefficient data stored in the memory device may be used.

The SoC 110 or SoC 210 may perform operation S330 when the heating coefficient and cooling coefficient estimated at a previous time point are abnormal.

In operation S330, the SoC 110 or SoC 210 may calculate the power budget without being based on the heating coefficient and cooling coefficient. In some example embodiments, in operation S330, the SoC 110 or SoC 210 may calculate the power budget of each of the plurality of operation processing units based on the ratio of the target temperature and the temperature of each of the plurality of operation processing units. For example, the power budget may be determined by multiplying the power consumption based on the operating frequency and driving voltage of each operation processing unit at the current time point by the ratio. After calculating the power budget in operation S330, the SoC 110 or SoC 210 may return to operation S230 of adjusting the power budget or operation S240 of determining the operating frequency in FIG. 8.

The SoC 110 or SoC 210 may perform operation S340 when the heating coefficient and cooling coefficient estimated at the previous time point are normal.

In operation S340, the SoC 110 or SoC 210 may adjust the heating coefficient and cooling coefficient estimated at the current time point based on the heating coefficient and cooling coefficient estimated at the previous time point.

For example, the average value of the coefficients estimated at the previous time point and the coefficients estimated at the current time point may be determined as the final cooling and heating coefficients. The average value may be calculated by one of the arithmetic mean, harmonic mean, and weighted mean, or by other methods.

Figure 10:
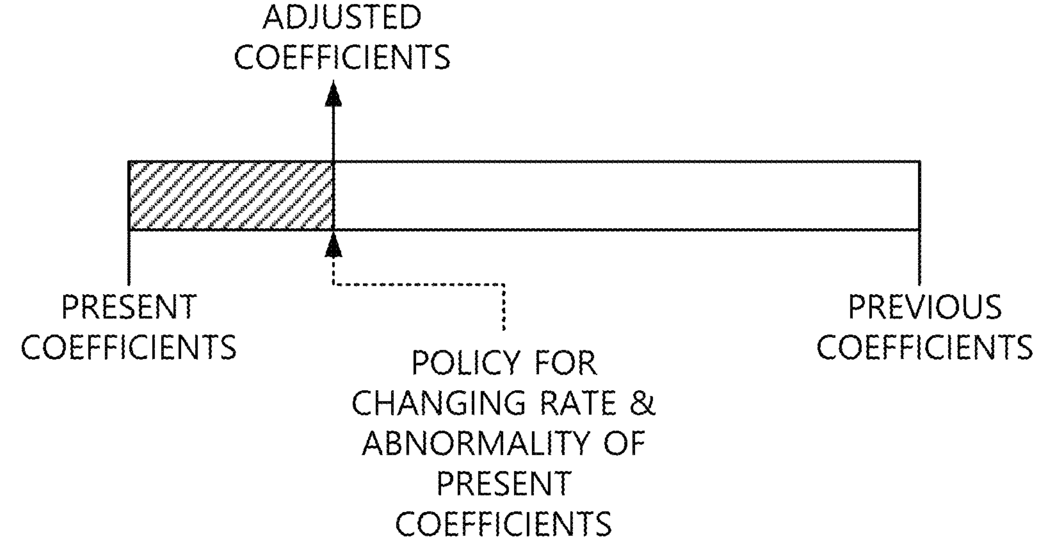
FIG. 10 is a diagram illustrating a method of adjusting the cooling coefficient and heating coefficient of a system on a chip (SoC) according to some example embodiments.

In some example embodiments, the SoC 110 or SoC 210 may determine the weighted average value of the coefficients estimated at a previous time point and the coefficients estimated at the current time point as the final cooling and heating coefficients. For example, a weighted average value that reflects a preset weight to the coefficients estimated at the current time point and the coefficients estimated at a previous time point may be determined as the final cooling and heating coefficients. Referring to FIG. 10, in some example embodiments, the SoC 110 or SoC 210 may determine, as the final cooling and heating coefficients, the weighted average value interpolated by applying a higher weight reflecting the coefficients estimated at the current time point according to the operation policy. The weight may be changed depending on the operating policy of the SoC 110 or SoC 210.

According to some example embodiments, operation S340 may be performed selectively. For example, operation S340 may be performed depending on an example embodiment.

FIG. 11 is a flowchart illustrating a method of adjusting the power budget of a system-on-chip (SoC) according to some example embodiments. The power budget may correspond to the target usage power used to reach the target temperature for each of the plurality of operation processing units. The SoC may correspond to the SoC 110 of FIG. 1 and the SoC 210 of FIG. 5. A method of adjusting the power budget of a SoC described with reference to FIG. 11 may correspond to operation S230 in FIG. 8. Detailed descriptions of parts that overlap or are similar to those described with reference to FIGS. 1 to 10 will be omitted.

The method of adjusting a power budget according to some example embodiments described with reference to FIG. 11 is based on a change in the difference between the target temperature and the temperature of the SoC 110 or SoC 210. For example, the adjustment of the power budget in an example where the difference between the target temperature and the temperature of the SoC 110 or SoC 210 increases as time passes may be different from an example where the difference between the target temperature and the temperature of the SoC 110 or SoC 210 decreases as time passes.

In operation S231, the SoC 110 or SoC 210 may compare the target temperature with the temperature of each of the plurality of operation processing units.

For example, in operation S231, when the temperature of each of the plurality of operation processing units is higher than the target temperature, the SoC 110 or SoC 210 may perform operation S232, and when the temperature of each of the plurality of operation processing units is lower than the target temperature, the SoC 110 or SoC 210 may perform operation S233.

In operation S232, the SoC 110 or SoC 210 determines whether the difference between the target temperature and the temperature of the SoC 110 or SoC 210 increases as it is closer to the current time point. For example, the change in the first temperature difference which is the difference between the temperature of the SoC 110 or SoC 210 at the first time point (e.g., the previous time point) and the target temperature, and the change in the second temperature difference, which is the difference between the temperature of the SoC 110 or SoC 210 at the second time point (e.g., the current time point) and the target temperature is determined. In other words, in some example embodiments, the change in the first temperature difference (e.g., the difference between the temperature of SoC 110 or SoC 210 at the first time point (e.g., the previous time point)) and the target temperature, and the change in the second temperature difference (e.g., the difference between the temperature of the SoC 110 or SoC 210 at the second time point (e.g., current time point) is determined. In some example embodiments, when the second temperature difference is larger than the first temperature difference, operation S234 may be performed, and when the second temperature difference is smaller than the first temperature difference, operation S235 may be performed.

Figure 12A:
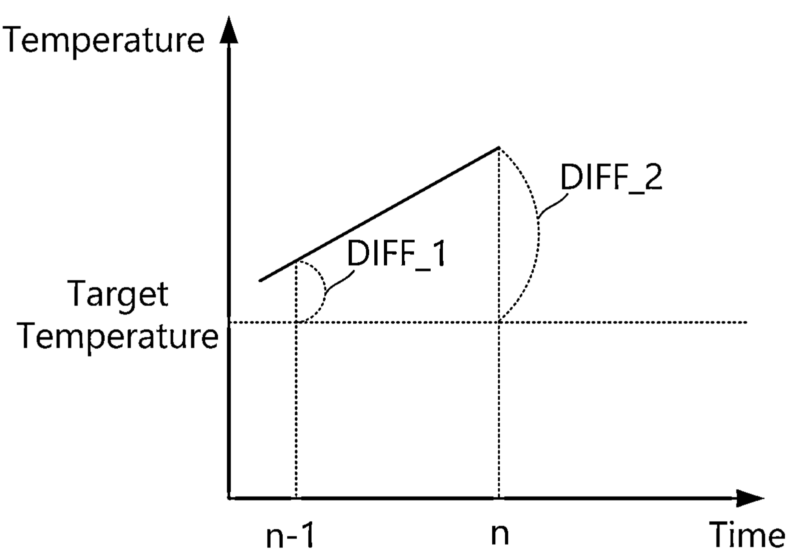
FIGS. 12A-12B and 13A-13B are diagrams illustrating a method of adjusting the power budget according to a change in temperature difference of a system on a chip (SoC) according to some example embodiments.

Referring to FIG. 12A, the temperature of the SoC 110 or SoC 210 at the current time point (n) is higher than the target temperature. For example, FIG. 12A illustrates a situation where a second temperature difference DIFF_2, which is the difference between the temperature of the SoC 110 or SoC 210 and the target temperature at the current time point (n), is greater than a first temperature difference DIFF_1 which is the difference between the temperature of the SoC 110 or SoC 210 at the previous time point (n−1) and the target temperature. For example, FIG. 12A illustrates a situation where the difference between the temperature of the SoC 110 or SoC 210 and the target temperature increases as the time point approaches the current time point (n) after the previous time point (n−1), so that the temperature of the SoC 110 or SoC 210 becomes further away from the target temperature.

Figure 12B:
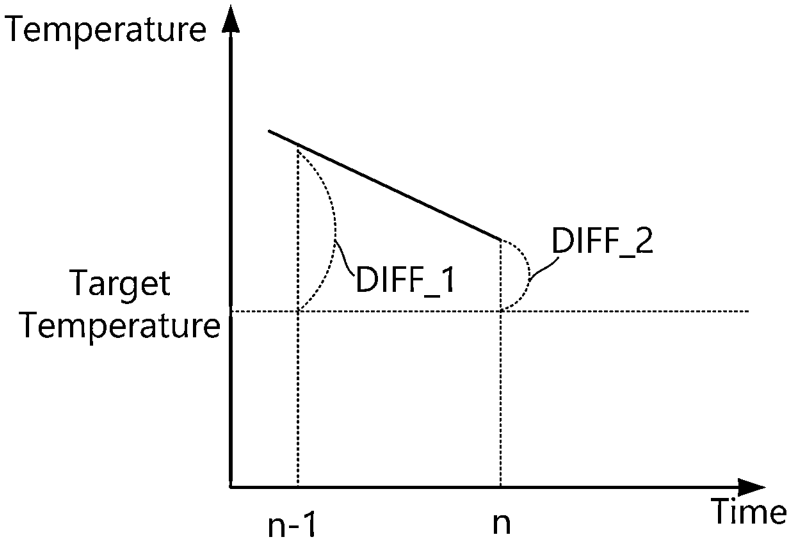

Referring to FIG. 12B, the temperature of the SoC 110 or SoC 210 at the current time point (n) is higher than the target temperature. For example, FIG. 12B illustrates a situation where the second temperature difference DIFF_2, which is the difference between the temperature of the SoC 110 or SoC 210 and the target temperature at the current time point (n), is smaller than the first temperature difference DIFF_1 which is the difference between the temperature of the SoC 110 or SoC 210 at the previous time point (n−1) and the target temperature. For example, FIG. 12B illustrates a situation where the difference between the temperature of the SoC 110 or 210 and the target temperature decreases as the time point approaches the current time point (n) after the previous time point (n−1), so that the temperature of the SoC 110 or SoC 210 is closer to the target temperature.

In operation S234, the SoC 110 or SoC 210 may actively adjust the calculated power budget to use as small a power budget as possible, considering the situation in which the temperature of the SoC 110 or SoC 210 is further away from the target temperature. Accordingly, in some example embodiments, the SoC 110 or SoC 210 may compare the calculated power budget with the power budget reduced from the power budget at the previous time point (n−1) and determine the smaller power budget as the final power budget.

In some example embodiments, a power budget that is reduced by a preset power amount from the power budget at the previous time point (n−1), or a power budget lowered by a preset level difference at the system-on-chip level of the DVFS table of FIG. 6 may be used.

In operation S235, the SoC 110 or SoC 210 may stably adjust the calculated power budget by considering a situation where the temperature of the SoC 110 or SoC 210 is close to the target temperature. Accordingly, in some example embodiments, the SoC 110 or SoC 210 may compare the calculated power budget with the power budget at the previous time point (n−1) and determine the smaller power budget as the final power budget.

In operations S234 and S235, the SoC 110 or SoC 210 compares the calculated power budget with the power budget at the previous time point (n−1) (or a power budget reduced from the power budget at the previous time point (n−1)) and determines the smaller power budget as the final power budget, but the example embodiments are not limited thereto and, in some example embodiments, other methods of adjusting the power budget may be used. For example, the SoC 110 or SoC 210 may determine the average value of the calculated power budget and the power budget at the previous time point (n−1) (or the power budget reduced from the power budget at the previous time point (n−1)) as the final power budget. The average value may be calculated as one of the arithmetic mean, harmonic mean, and weighted mean, or by other methods. In the weighted mean, a weighted average value that further reflects one of the power budget calculated according to the operating policy and the power budget at the previous time point (n−1) (or the power budget reduced from the power budget at the previous time point (n−1)) may be determined as the final power budget.

In operation S233, the SoC 110 or SoC 210 determines whether the difference between the target temperature and the temperature of the SoC 110 or SoC 210 increases as it is closer to the current time point. For example, the change in the first temperature difference which is the difference between the temperature of the SoC 110 or 210 at the first time point, which is the previous time, and the target temperature, and the change in the second temperature difference, which is the difference between the temperature of the SoC 110 or 210 at the second time point, which is the current time point, and the target temperature is determined. In some example embodiments, when the second temperature difference is larger than the first temperature difference, operation S236 may be performed, and when the second temperature difference is smaller than the first temperature difference, operation S237 may be performed.

Figure 13A:
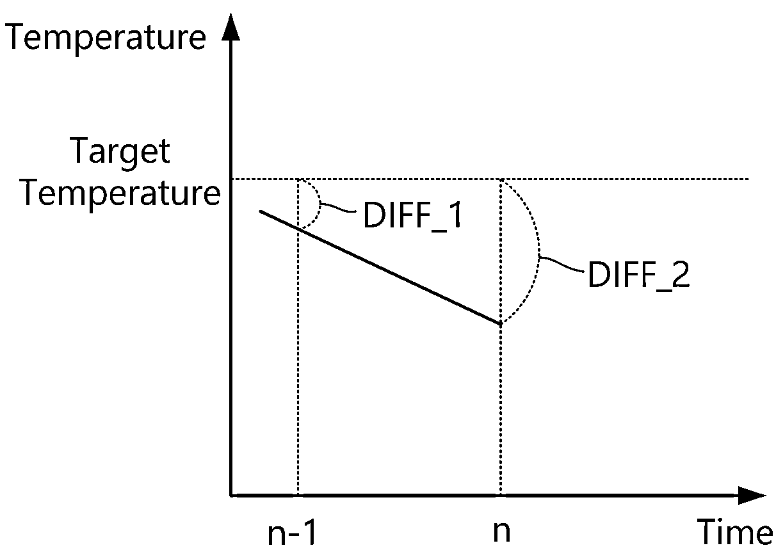

Referring to FIG. 13A, the temperature of the SoC 110 or SoC 210 at the current time point (n) is lower than the target temperature. For example, FIG. 13A illustrates a situation where the second temperature difference DIFF_2, which is the difference between the temperature of the SoC 110 or SoC 210 and the target temperature at the current time point (n), is greater than the first temperature difference DIFF_1 which is the difference between the temperature of the SoC 110 or 210 at the previous time point (n−1) and the target temperature. For example, FIG. 13A illustrates a situation where the difference between the temperature of the SoC 110 or 210 and the target temperature increases as the time point approaches the current time point (n) after the previous time point (n−1), so that the temperature of the SoC 110 or 210 becomes further away from the target temperature.

Figure 13B:
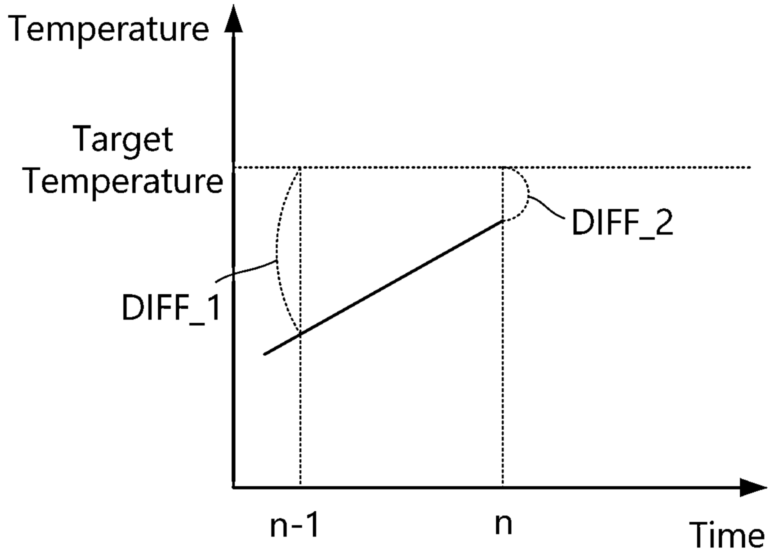

Referring to FIG. 13B, the temperature of the SoC 110 or SoC 210 at the current time point (n) is lower than the target temperature. For example, FIG. 13B illustrates a situation where the second temperature difference DIFF_2, which is the difference between the temperature of the SoC 110 or SoC 210 and the target temperature at the current time point (n), is smaller than the first temperature difference DIFF_1 which is the difference between the temperature of the SoC 110 or SoC 210 at the previous time point (n−1) and the target temperature. For example, FIG. 13B illustrates a situation where the difference between the temperature of the SoC 110 or SoC 210 and the target temperature decreases as the time point approaches the current time point (n) after the previous time point (n−1), so that the temperature of the SoC 110 or SoC 210 is closer to the target temperature.

In operation S236, the SoC 110 or SoC 210 may actively adjust the calculated power budget to use as large a power budget as possible, considering the situation in which the temperature of the SoC 110 or 210 is further away from the target temperature. Accordingly, in some example embodiments, the SoC 110 or 210 may compare the calculated power budget with the power budget reduced from the power budget at the previous time point (n−1) and determine the larger power budget as the final power budget.

In some example embodiments, a power budget that is increased by a preset power amount from the power budget at the previous time point (n−1), or a power budget that is increased by a preset level difference at the SoC level of the DVFS table of FIG. 6 may be used.

In operation S237, the SoC 110 or SoC 210 may stably adjust the calculated power budget by considering a situation where the temperature of the SoC 110 or 210 is close to the target temperature. Accordingly, in some example embodiments, the SoC 110 or SoC 210 may compare the calculated power budget with the power budget at the previous time point (n−1) and determine the larger power budget as the final power budget.

In operations S236 and S237, the SoC 110 or SoC 210 does not exclude other methods of adjusting the power budget. Similar to those described in operations S234 and S235, in some example embodiments, the SoC 110 or SoC 210 may determine the average value of the calculated power budget and the power budget at the previous time point (n−1) (or the power budget reduced from the power budget at the previous time point (n−1)) as the final power budget.

FIG. 14 is a block diagram showing an example electronic device 400 according to some example embodiments. A device according to some example embodiments may be an electronic device including electrical circuits. Detailed description of parts that overlap or are similar to those described with reference to FIGS. 1 to 13 will be omitted.

Referring to FIG. 14, the electronic device 400 may include a plurality of electric circuits 410_1, 410_2, . . . , **410_*n*, a temperature collection module (TCM) 420, a temperature management (DTM) module 430, a circuit controller 440, a power controller 450, and a memory device 460**.

The plurality of electric circuits 410_1, 410_2, . . . , **410_*n* may be the operation processing units of a system-on-chips (SoC) described with reference to FIGS. 1 to 13**, or other types of electric circuits.

Each of the plurality of electric circuits 410_1, 410_2, . . . , **410_*n* may include temperature sensors S1, S2, . . . , Sn. Each of the temperature sensors S1, S2, . . . , Sn may be plural. For example, in some example embodiments, each of the plurality of electric circuits 410_1, 410_2, . . . , 410_*n*** may include a plurality of temperature sensors.

The temperature collection module (TCM) 420 may collect the temperatures measured by the temperature sensors S1, S2, . . . , Sn and change them to a representative temperature of each of the plurality of electric circuits 410_1, 410_2, . . . , **410_*n***.

The circuit controller 440 may control variables that affect performance, heating, and/or cooling of each of the plurality of electric circuits 410_1, 410_2, . . . , **410_*n*. For example, when each of the plurality of electric circuits 410_1, 410_2, . . . , 410_*n* is an operation processing unit, the circuit controller 440 may change the frequency of the clock signal provided to each of the plurality of electric circuits 410_1, 410_2, . . . , 410_*n*. In some example embodiments, the circuit controller 440 may output signals that control various variables that affect the performance, heating, and/or cooling of each of the plurality of electric circuits 410_1, 410_2, . . . , 410_*n***.

The power controller 450 may provide a driving voltage to each of the plurality of electric circuits 410_1, 410_2, . . . , **410_*n***.

The temperature management (DTM) module 430 according to some example embodiments may estimate the cooling coefficient and heating coefficient of each of the plurality of electric circuits 410_1, 410_2, . . . , **410_*n*, and determine the value of one of the variables used in each of the electric circuits 410_1, 410_2, . . . , 410_*n* to reach the target temperature. The temperature management (DTM) module 430 may provide the determined value to the circuit controller 440**.

The temperature management (DTM) module 430 may estimate the cooling coefficient and heating coefficient by substituting one of the various variables that affect the performance, heating, and/or cooling of each of the plurality of electric circuits 410_1, 410_2, . . . , **410_*n* for the operating frequency ($F_n$) and the driving voltage ($V_n$) of Equation 1 and Equation 2 described with reference to FIG. 3. In some example embodiments, based on the estimated cooling and heating coefficients, the value of one of the variables may be determined such that each of the plurality of electric circuits 410_1, 410_2, . . . , 410_*n*** reaches the target temperature.

Accordingly, the example embodiment described with reference to FIG. 14 may perform dynamic thermal management even with electric circuits other than the operation processing unit of the SoC.

Figure 15:
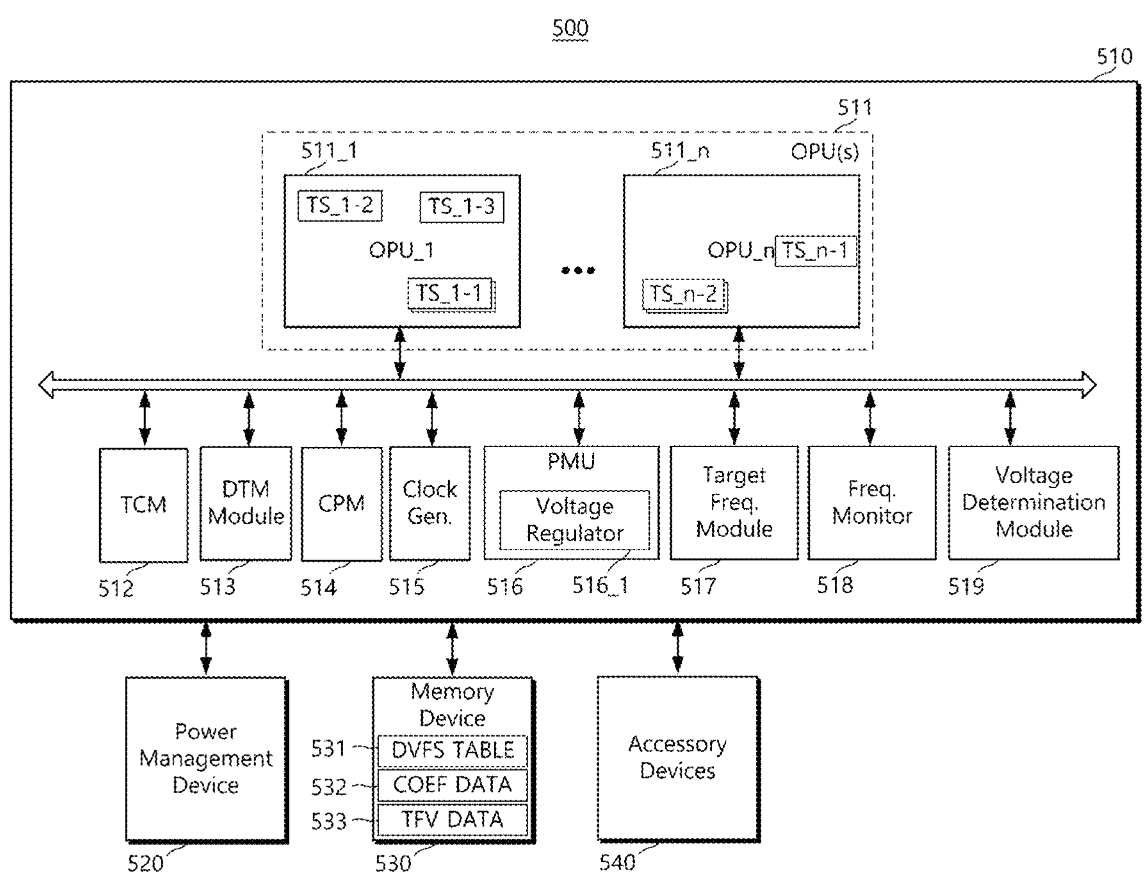
FIG. 15 is a block diagram illustrating in detail the configuration of a system-on-chip (SoC) according to some example embodiments.

FIG. 15 is a block diagram illustrating in detail the configuration of a system-on-chip (SoC) according to some example embodiments. A SoC 510 of FIG. 15 may determine the operating frequency of the SoC 510 suitable for the target temperature based on the thermal model described with reference to FIGS. 2 to 4. Detailed description of parts that overlap or are similar to those described with reference to FIGS. 1 to 14 will be omitted.

The example embodiment described with reference to FIG. 15 may perform a closed loop dynamic voltage frequency scaling operation on at least one operation processing unit (OPU(s)) 511 to change the frequency of the clock signal.

Referring to FIG. 15, a computing system 500 may include the system-on-a-chip (SoC) 510, a power management device 520, a memory device 530, and accessory devices 540.

The SoC 510 may include at least one operation processing unit (OPU(s)) 511, a temperature collection module (TCM) 512, a temperature management (DTM) module 513, and a critical path monitor (CPM) 514, a clock signal generator (Clock Gen.) 515, a power management unit (PMU) 516, a target frequency module 517, a frequency monitor 518, and a voltage determination module 519.

The SoC 510 may communicate with the power management device 520, the memory device 530, and the accessory devices 540.

Each (OPU_1 to OPU_n) 511_1 to 511_*n* of the operation processing units (OPU(s)) 511 may include at least one temperature sensors TS_1-1, TS_1-2, TS_1-3, . . . , TS_n−1, and TS_n−2. Each of the temperature sensors TS_1-1, TS_1-2, TS_1-3, . . . , TS_n−1, and TS_n−2 may measure temperature and provide the measured temperature to the temperature collection module 512. The temperature collection module (TCM) 512 may convert the temperature into a representative temperature of each (OPU_1 to OPU_n) 511_1 to 511_*n* of the operation processing units (OPU(s)) 511 based on the measured temperature, and then may provide the representative temperature to the temperature management (DTM) module 513.

The temperature management (DTM) module 513 according to some example embodiments may estimate the cooling coefficient and heating coefficient of the SoC 510 based on the representative temperature of each (OPU_1 to OPU_n) 511_1 to 511_*n* of the operation processing units (OPU(s)) 511 and the thermal model described with reference to FIGS. 2 to 4. The SoC 510 may estimate the cooling coefficient and the heating coefficient by using representative temperature, operating frequency, and driving voltage data (TFV DATA) 533 stored in the memory device 530 at a previous time point. The cooling coefficient and heating coefficient estimated at a plurality of time points may be stored in the memory device 530 as cooling coefficient and heating coefficient data (COEF DATA) 532.

The temperature management (DTM) module 513 may determine the operating frequency of the SoC 510 based on the estimated cooling and heating coefficients, the current temperature of the SoC 510, a DVFS table 531 stored in the memory device 530, and the target temperature.

The target frequency module 517 may determine the target frequency based on the DVFS table 531 and the determined operating frequency.

The determined target frequency may be compared with the frequency of each (OPU_1 to OPU_n) 511_1 to 511_*n* of the operation processing units (OPU(s)) 511 measured by the frequency monitor 518, and the difference value may be provided to the voltage determination module 519.

The CPM 514, clock signal generator 515, target frequency module 517, frequency monitor 518, voltage determination module 519, and a voltage regulator 516_1 may constitute an outer loop.

The voltage determination module 519 may determine the supply voltage during the next outer loop operation based on the frequency of each (OPU_1 to OPU_n) 511_1 to 511_*n* of the operation processing units (OPU(s)) 511 measured by the frequency monitor 518, and the target frequency determined by the temperature management (DTM) module 513.

The supply voltage determined by the voltage determination module 519 may be provided to the PMU 516. The voltage regulator 516_1 of the PMU 516 may generate the driving voltage by regulating the voltage provided by the power management device 520 based on the determined supply voltage, and may provide the generated driving voltage to each (OPU_1 to OPU_n) 511_1 to 511_*n* of the operation processing units (OPU(s)) 511.

The CPM 514 may monitor clock signals provided to each (OPU_1 to OPU_n) 511_1 to 511_*n* of the operation processing units (OPU(s)) 511.

The CPM 514 and the clock signal generator 515 may form an inner loop. The inner loop may be performed repeatedly, and at every inner loop cycle, the CPM 514 may monitor the clock signal of each (OPU_1 to OPU_n) 511_1 to 511_*n* of the operation processing units (OPU(s)) 511. Each monitored clock signal may be fed back to the clock signal generator 515 every inner loop cycle, so that the frequency of the clock signal may be changed. The outer loop operation may be performed with a cycle longer than the inner loop cycle. For example, multiple inner loop operations may be performed within one outer loop cycle.

Accordingly, in the example embodiment described with reference to FIG. 15, the temperature management module 513 may determine the operating frequency of each (OPU_1 to OPU_n) 511_1 to 511_*n* of the operation processing units (OPU(s)) 511 by using the thermal model based on the cooling coefficient and the heating coefficient. Based on the result of comparing the target frequency determined based on the operating frequency with the monitored clock signal of each (OPU_1 to OPU_n) 511_1 to 511_*n* of the operation processing units (OPU(s)) 511, the frequency of the clock signal may be changed by being fed back to the clock signal generator 515 every inner loop cycle. In some example embodiments, the supply voltage during the next outer loop operation may be determined based on the comparison result.

Figure 16:
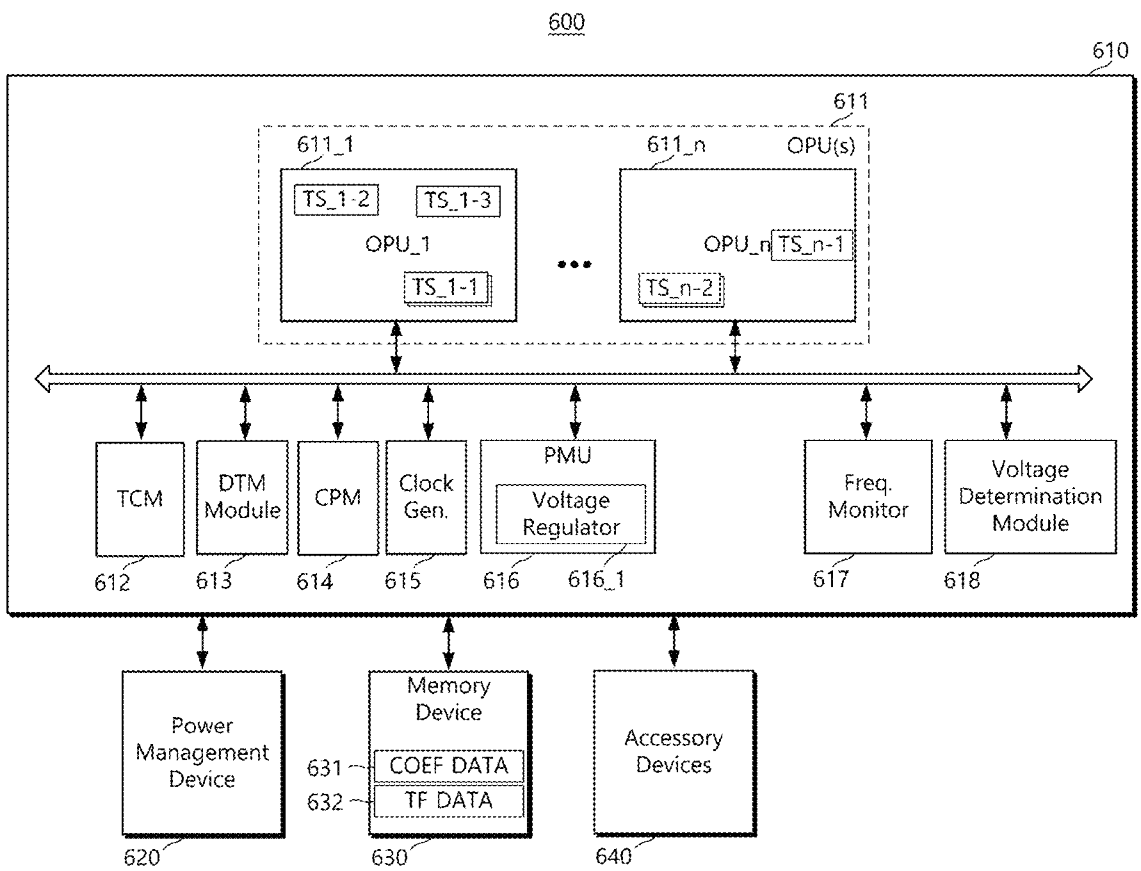
FIG. 16 is a block diagram showing in detail the configuration of a system on chip (SoC) according to some example embodiments.

FIG. 16 is a block diagram showing in detail the configuration of a system on chip (SoC) according to some example embodiments. Detailed descriptions of parts that are overlapping or similar to those described with reference to FIGS. 1 to 15 will be omitted, and the description will focus on differences from the embodiment described with reference to FIG. 15.

A temperature management (DTM) module 613 of FIG. 16 may determine the operating frequency of a SoC 610 suitable for the temperature based on a thermal model in which some of heating elements HEs and/or some of cooling elements CEs described with reference to FIGS. 2 to 4 are changed.

For example, in Equation 1 described above, among the heating elements HEs, the thermal model may be modified based on that elements which are dynamically controllable in the temperature management module 613 may be based only on the operating frequency HE3 of the SoC 610.

$$T_n \times C + \alpha(F_n) \times H = T_{n+1} \quad \text{(Equation 3)}$$

Therefore, Equation 1 may be converted into Equation 3. For example, unlike the thermal model based on Equation 1, the thermal model based on Equation 3 may exclude the driving voltage HE4. For example, the heating coefficient of the thermal model based on Equation 3 is based only on operating frequency $F_n$. Function α( ) may be determined by monitoring changes in temperature and operating frequency of the SoC 610.

The temperature management module 613 may estimate the cooling coefficient and the heating coefficient by using the thermal model based on Equation 3.

The temperature management module 613 may determine the target frequency of the SoC 510 based on the estimated cooling and heating coefficients, and the target temperature. For example, unlike the previously described example embodiments, the temperature management module 613 may determine the target frequency based on Equation 3, not based on a preset DVFS table. The determined target frequency may be provided to a clock signal generator 615. Therefore, according to some example embodiments, the DVFS table may not be used separately.

The temperature management (DTM) module 613 may store the cooling coefficient and heating coefficient estimated at each time point as cooling coefficient and heating coefficient data (COEF DATA) 631 in a memory device 630.

The temperature management (DTM) module 613 may store the frequency of the clock signal provided to each (OPU_1 to OPU_n) 611_1 to 611_*n* of the plurality of operation processing units (OPU(s)) 611 at plural time points and the representative temperature in the memory device 230 as representative temperature and operating frequency data (TF DATA) 633.

One or more of the elements disclosed above may include or be implemented in one or more processing circuitries such as hardware including logic circuits; a hardware/software combination such as a processor executing software or a combination thereof. For example, the processing circuitries more specifically may include, but are not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

As described herein, any devices, electronic devices, modules, units, and/or portions thereof according to any of the example embodiments, and/or any portions thereof may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions and a processor (e.g., CPU) configured to execute the program of instructions to implement the functionality and/or methods performed by some or all of any devices, electronic devices, modules, units, and/or portions thereof according to any of the example embodiments.

Any of the memories described herein may be a non-transitory computer readable medium and may store a program of instructions. Any of the memories described herein may be a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM).

Although some example embodiments have been described above with reference to the accompanying drawings, example embodiments of the present inventive concepts are not limited to only the above-described example embodiments, and may be implemented in various different forms. In addition, the present inventive concepts may include techniques that may easily modify and implement the example embodiments. Therefore, the scope of the present inventive concepts should not be limited to the above-described example embodiments, but should be defined by the claims described below as well as the claims and any equivalents thereof.

What is claimed is:

1. A system on chip, comprising:

at least one operation processing unit configured to process an instruction based on a driving voltage and a clock signal; and processing circuitry configured to estimate a cooling coefficient and a heating coefficient associated with the at least one operation processing unit based on a temperature measured at the at least one operation processing unit, determine an operating frequency of the clock signal to be sent to the at least one operation processing unit based on the cooling coefficient and the heating coefficient, and output a control signal for adjusting the driving voltage and the clock signal based on the operating frequency, wherein the processing circuitry is configured to determine a target usage power associated with a target temperature, the target usage power determined based on a current temperature of at least one operation processing unit, the target temperature, the cooling coefficient, and the heating coefficient, and the processing circuitry is configured to determine the operating frequency of the clock signal to be sent to the at least one operation processing unit based on the target usage power.

2. The system on chip of claim 1, wherein the processing circuitry is configured to estimate the cooling coefficient and the heating coefficient based on past temperatures previously measured multiple times by the at least one operation processing unit, and past operating frequencies and past driving voltages associated with the past temperatures measured multiple times by the at least one operation processing unit.

3. The system on chip of claim 1, wherein the processing circuitry is configured to estimate the cooling coefficient and the heating coefficient based on past temperatures previously measured multiple times by the at least one operation processing unit, and past operating frequencies associated with the past temperatures measured multiple times by the at least one operation processing unit.

4. The system on chip of claim 1, wherein the processing circuitry is configured to determine the operating frequency of the clock signal to be sent to the at least one operation processing unit based on the current temperature, the target temperature, the cooling coefficient, and the heating coefficient of the at least one operation processing unit.

5. The system on chip of claim 4, wherein the processing circuitry is configured to determine the operating frequency based on a lookup table where the operating frequency of the clock signal and the driving voltage are mapped.

6. The system on chip of claim 1, wherein the processing circuitry is configured to determine a difference between the target temperature and the current temperature at a first time point as a first temperature difference, determine a difference between the target temperature and the current temperature at a second time point after the first time point as a second temperature difference, and adjust the target usage power at the second time point based on the first temperature difference and the second temperature difference.

7. The system on chip of claim 1, wherein the cooling coefficient is based on a rate of temperature drop of the at least one operation processing unit due to cooling elements that affect the temperature drop of the at least one operation processing unit, and the heating coefficient is based on a rate of temperature rise of the at least one operation processing unit due to heating elements that affect the temperature rise of the at least one operation processing unit.

8. The system on chip of claim 1, wherein the processing circuitry is configured to verify the cooling coefficient and the heating coefficient.

9. The system on chip of claim 1, wherein the processing circuitry is configured to adjust each of the cooling coefficient and the heating coefficient determined at a current control time point based on each of the cooling coefficient and the heating coefficient determined at a previous control time point, and determine the operating frequency of the clock signal based on the adjusted cooling coefficient and the adjusted heating coefficient.

10. The system on chip of claim 9, wherein the processing circuitry is configured to determine the adjusted cooling coefficient and the adjusted heating coefficient as interpolated values by assigning weights to each of the cooling coefficient and the heating coefficient determined at the previous control time point and each of the cooling coefficient and the heating coefficient determined at the current control time point, and determine the operating frequency of the clock signal based on the adjusted cooling coefficient and the adjusted heating coefficient.

11. The system on chip of claim 1, further comprising:

a clock signal generator configured to send the clock signal to the at least one operation processing unit;

wherein the processing circuitry is configured to monitor the clock signal, and a power management unit configured to generate the driving voltage, wherein the processing circuitry is configured to determine the driving voltage based on a supply voltage determined by comparing the operating frequency and the clock signal.

12. A method of operating a system on chip (SoC), the method comprising:

checking a temperature of an operation processing unit measured by a temperature sensor;

estimating a cooling coefficient and a heating coefficient of the operation processing unit based on the temperature;

determining an operating frequency of a clock signal to be sent to the operation processing unit based on the cooling coefficient and the heating coefficient;

outputting control signals that adjust each of a driving voltage and the clock signal sent to the operation processing unit based on the operating frequency; and processing an instruction based on the driving voltage and the clock signal, wherein the determining of the operating frequency of the clock signal includes determining a target usage power associated with a target temperature, the target usage power determined based on a current temperature, the target temperature, the cooling coefficient, and the heating coefficient of the operation processing unit, and wherein the determining the operating frequency of the clock signal to be sent to the operation processing unit is based on the target usage power.

13. The method of claim 12, wherein the estimating of the cooling coefficient and the heating coefficient includes estimating the cooling coefficient and the heating coefficient based on past temperatures previously measured multiple times by the operation processing unit, and past operating frequencies and past driving voltages associated with the past temperatures measured multiple times by the operation processing unit.

14. The method of claim 12, wherein the determining of the operating frequency of the clock signal includes determining the operating frequency of the clock signal to be sent to the operation processing unit based on the current temperature, the target temperature, the cooling coefficient, and the heating coefficient of the operation processing unit.

15. The method of claim 12, further comprising:

determining a difference between the target temperature and the current temperature at a first time point as a first temperature difference, determining a difference between the target temperature and the current temperature at a second time point after the first time point as a second temperature difference, and adjusting the target usage power at the second time point based on a comparison result between the first temperature difference and the second temperature difference.

16. The method of claim 12, further comprising:

adjusting each of the cooling coefficient and the heating coefficient determined at a current control time point based on each of the cooling coefficient and the heating coefficient determined at a previous control time point, and determining the operating frequency of the clock signal based on the adjusted cooling coefficient and the adjusted heating coefficient.

17. The method of claim 16, further comprising:

determining the adjusted cooling coefficient and the adjusted heating coefficient as interpolated values by assigning weights to each of the cooling coefficient and the heating coefficient determined at the previous control time point and each of the cooling coefficient and the heating coefficient determined at the current control time point.

18. An electronic device, comprising:

at least one electrical circuit configured to be driven based on a received driving voltage and a parameter;

processing circuitry configured to estimate a cooling coefficient and a heating coefficient associated with the at least one electrical circuit based on a temperature measured at the at least one electrical circuit, and determine a value of the parameter to be sent to the at least one electrical circuit based on the cooling coefficient and the heating coefficient; and a circuit configured to output a control signal for adjusting the parameter based on the value of the parameter, wherein the processing circuitry is configured to determine a target usage power associated with a target temperature, the target usage power determined based on a current temperature of at least one operation processing unit, the target temperature, the cooling coefficient, and the heating coefficient, and the processing circuitry is configured to determine an operating frequency of a clock signal to be sent to the at least one operation processing unit based on the target usage power.

* * * * *